(12) United States Patent
Stunkard

(10) Patent No.: US 7,690,626 B2
(45) Date of Patent: Apr. 6, 2010

(54) BALL VALVE HAVING SELF-CENTERING SEATS

(76) Inventor: Gerald A. Stunkard, 9424 S. Cleveland, Jenks, OK (US) 74037

( * ) Notice: Subject to any disclaimer, the term of this patent is extended or adjusted under 35 U.S.C. 154(b) by 227 days.

(21) Appl. No.: 11/974,536

(22) Filed: Oct. 15, 2007

(65) Prior Publication Data

US 2009/0095931 A1    Apr. 16, 2009

(51) Int. Cl.
*F16K 5/06* (2006.01)
(52) U.S. Cl. .................. 251/174; 251/180; 251/315.08; 251/315.14
(58) Field of Classification Search ............ 251/315.08, 251/315.09, 315.14, 315.01, 174, 180, 192
See application file for complete search history.

(56) References Cited

U.S. PATENT DOCUMENTS

| 3,154,094 A | * | 10/1964 | Bredtschneider et al. .... 251/174 |
| 3,266,769 A | * | 8/1966 | Shand ......................... 251/174 |
| 3,508,736 A | * | 4/1970 | Pool et al. .............. 251/315.15 |
| 3,667,727 A | * | 6/1972 | Bowden ..................... 251/174 |
| 4,099,705 A | * | 7/1978 | Runyan .................. 251/315.14 |
| 4,254,793 A | * | 3/1981 | Scaramucci .................. 251/192 |
| 4,292,989 A | * | 10/1981 | Cazzaniga et al. .......... 251/174 |
| 4,386,756 A | * | 6/1983 | Muchow ................. 251/315.09 |
| 4,505,294 A | * | 3/1985 | Walter ........................ 251/174 |
| 4,658,847 A | * | 4/1987 | McCrone ................. 251/315.1 |
| 6,217,002 B1 | * | 4/2001 | Shafer ........................ 251/192 |
| 6,669,171 B1 | * | 12/2003 | Stunkard ............... 251/315.08 |

* cited by examiner

*Primary Examiner*—John Bastianelli
(74) *Attorney, Agent, or Firm*—James L. Jackson

(57) ABSTRACT

A trunnion type ball valve having valve seats that are laterally moveable within seat recesses of the valve and establish sealing engagement with a valve ball member that is trunnion supported for rotational movement between open and closed positions. The valve seat members are self-centering for optimum sealing engagement with the spherical sealing surface of the ball member. The internal geometry of the seat assemblies are designed to permit optimum flow through the valve mechanism even under circumstances where the seat members are located in laterally off-center relation with respect to the centerline of the flow passages due to self-centering seat movement. The ball valve is readily adapted for fire-safe application via the use of heat resistant seals and metal-to-metal sealing of components to prevent or minimize leakage in the event of seal destruction or degradation by excess heat.

17 Claims, 13 Drawing Sheets

BALL VALVE HAVING SELF-CENTERING SEATS

BACKGROUND OF THE INVENTION

1. Field of the Invention

The present invention relates generally to the field of ball valves and more particularly concerns trunnion type ball valves having valve seats that are moveable with the valve and establish sealing engagement with a valve ball member that is supported for rotational movement between open and closed positions. More particularly the present invention concerns trunnion type ball valves having seat members that are laterally moveable within seat recesses for self-centering and optimum sealing engagement with the spherical sealing surface of the trunnion mounted valve ball member.

2. Description of the Prior Art

The two basic types of ball valves, floating ball valves and trunnion ball valves, are each designed for opening and closing movement with a quarter turn of rotary movement of a valve ball. Floating ball valves employ valve seats that may be fixed or moveable within a valve chamber and employ a valve ball member that has the capability of being moved either mechanically or by pressure response so as to seek an optimum sealing relation with respect to the downstream seat assembly of the valve. Typically, floating ball valves can be of relatively low cost manufacture as compared with other ball valves and are typically quite satisfactory for low to medium pressure service. One of the disadvantages of floating ball valves is the unusually significant seat wear that often occurs as the result of pressure responsive valve ball force against the downstream seat of the valve. Frequent maintenance for seat replacement may be needed, thus requiring a flow line to be shut down for maintenance more frequently than is desired. When elevated pressure conditions are encountered, many floating ball valves can require high torque forces for opening and closing movement and many experience significant seat wear, particularly downstream seat wear, since greater pressure responsive force of the valve ball member is often applied to the downstream seat.

Trunnion ball valves typically have a valve body within which a valve ball member is mounted for rotation by trunnions, trunnion supports and trunnion bearings. A trunnion mounting system typically permits the valve ball to be rotated to its open and closed positions and prevents the valve ball from being subjected to pressure responsive movement within the valve body. Trunnion ball valves are typically of more expensive manufacture as compared with floating ball valves; however the more expensive manufacturing cost is typically offset by desirable features that are known in these types of ball valves. Typically trunnion type ball valves are capable of operating at higher pressure conditions as compared with floating ball valves. Since the valve ball member is supported for rotation within the valve body and is prevented from downstream movement by differential pressure, there is no tendency for a condition of high operating torque to be experienced unless some other factor becomes evident. The valve seats of trunnion type ball valves are not normally subject to excessive wear during operation. One or more seats may be mechanically energized such as by means of seat springs and may be energized responsive to differential pressure to ensure that efficient sealing will occur at all pressure conditions, without experiencing unusual seat wear when operating pressure becomes elevated. And, since the valve ball is stabilized within the valve body by the trunnion mounting system, there is no tendency for the sealing surface of the valve ball to become unusually worn or eroded during normal operation.

SUMMARY OF THE INVENTION

It is a principal feature of the present invention to provide a novel trunnion type ball valve having seat assemblies that are spring energized for seat movement to maintain sealing engagement with a trunnion supported rotary ball member;

It is also a feature of the present invention to provide a novel trunnion type ball valve having seat assemblies that have the facility for lateral movement as well as movement toward the valve ball member, thus permitting the valve seats to have self-centering capability for optimum sealing engagement with the valve ball member at all valve ball and valve service conditions;

It is another feature of the present invention to provide a novel trunnion type ball valve having seat assemblies with seats that are pressure energized for development of a sealing capability that is responsive to the pressure of the fluid being controlled by the valve;

It is an even further feature of the present invention to provide a novel trunnion type ball valve having seat assemblies that are designed to permit optimum smooth and turbulence free flow of fluid through the flow passages and ports of the valve mechanism even though one or both the seat members of the seat assemblies may be shifted laterally within the seat recesses by the self-centering feature thereof; and It is also a feature of the present invention to provide a novel trunnion type ball valve having self-centering seat assemblies and also having the capability for maintaining efficient sealing of the valve seats and the operating stem and stem packing mechanisms in the event elastomer or polymer seals of the valve are destroyed or degraded by a condition of excessive heat.

Briefly, the present invention concerns a trunnion type ball valve having self-centering seats wherein the seats are designed for both mechanical and pressure energized urging means to ensure independent movement of each seat into optimum sealing engagement with the spherical sealing surface of the ball member. One of the valve seat assemblies may be retained within a seat recess that is defined within the valve body. The other valve seat assembly or in some cases both of the valve seat assemblies are retained within seat recesses that are defined by seat retainer members that are threaded into or otherwise seated within opposite axial ends of the valve body. Each seat assembly includes an annular seat support and an annular valve seat. The seat support linearly moveable within the seat recess and is urged toward the valve seat and valve ball by one or more spring members that apply spring force to the annular seat support. The spring force is sufficient only to establish light sealing contact of the seat members with the spherical sealing surface of the valve ball member. The dimension of the annular seat members relative to the adjacent annular wall surface of the seat recess is of sufficiently different dimension that an annular clearance is defined between the outer periphery of each seat member and the adjacent annular wall surface, thus establishing an annular clearance. This annular clearance permits the seat member to shift laterally within the seat recess and thus establish a self-centering relationship with the spherical sealing surface of the valve ball member. The annular seat support members are of such external dimension that they are linearly moveable within the respective seat recess, but they are restrained from significant lateral movement by their closeness of fit with an internal cylindrical wall surface portion of the seat recess.

The seat assemblies of the valve mechanism are designed to permit optimum flow through the valve mechanism even under circumstances where one or both of the flow ports of the seats may be somewhat misaligned with respect to the centerline of the flow passages due to self-centering seat movement. The seat assemblies are also designed with internal tapered surface portions to ensure that the laterally shifted positions of the seat members will not present the projection of any abrupt edges into the flow passages of the valve mechanism which might develop internal turbulence or impede the passage of pipe cleaning devices such as balls, scrapers, pigs, etc., through the valve. Thus, the pattern of fluid flow through the flow passages and ports within the valve mechanism may be altered to a limited extent, but remains generally smooth and free of turbulence that might otherwise interfere with the efficiency of the flow line that is controlled by the valve mechanism.

The trunnion type ball valve of the present invention additionally incorporates fire-safe features to ensure against valve leakage in the event a condition of excessive heat is encountered, such as in the event of a fire. In the event a valve controlling the flow of a combustible fluid such as oil, natural gas, gasoline etc., should begin to leak due to the destruction or degredation of its elastomer or polymer sealing elements during a fire, substantial quantities of the combustible fluid medium could be liberated, thus feeding the fire and impeding control of the fire by workers. A fire-safe trunnion ball valve embodiment incorporating the features of the present invention is provided with strategically located heat resistant seals in addition to the more conventional elastomer or polymer seals. Also, internal valve components are designed to establish metal-to-metal seals in the event the elastomer or polymer seals should be damaged or destroyed by high temperature conditions. Thus, in the case where the elastomer or polymer seals become destroyed or degraded to the extent that leakage would otherwise occur, the heat resistant seals and metal-to-metal seals will maintain the sealed integrity of the valve within fire-safe limits and provide protection for the environmental conditions in the immediate vicinity of the valve.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a longitudinal sectional view of a trunnion type ball valve that is constructed according to the principles of the present invention and shows an integral valve body containing a trunnion supported valve ball and self-centering valve seats and having a seat retainer member in threaded assembly therewith;

FIG. 2 is a longitudinal sectional view of a trunnion type ball valve that is similar to that shown in FIG. 1 and employing a pair of seat retainer members that are each in treaded assembly with the valve body;

FIG. 3 is a transverse sectional view that is taken along line 3-3 of FIGS. 1 or 2 and showing among other features the use of lubricant and pressure relief fittings which are mounted to the valve body and have communication with the valve chamber of the body and the presence of a particular stem packing assembly;

FIG. 4 is an end elevational view of the valve mechanisms of FIGS. 1 or 2;

FIG. 5 is an exploded longitudinal sectional view showing the components of the valve mechanism of FIG. 1 with one of the seat assemblies in place within its seat recess and with the stem packing assembly and operating handle removed from the valve body;

FIG. 6 is a longitudinal sectional view of the trunnion type ball valve of FIG. 1, further showing weld type end flange members being mounted to the valve body by bolts and presenting weld connections for welded assembly with flow line members;

FIG. 7 is a transverse sectional view that is taken along line 7-7 of FIG. 6 and showing the trunnion mounted valve ball member being located at the closed position thereof;

FIG. 8 is a fragmentary longitudinal sectional view showing the valve ball member in its open position and showing an upper portion of one of the self-centering seat assemblies in detail;

FIG. 9 is a fragmentary longitudinal sectional view showing a portion of a seat retainer ring as it is being threaded into the valve body;

FIG. 10 is a fragmentary longitudinal sectional view showing a portion of a seat retainer ring after it has been threaded into the valve body to its full extent, causing deformation of an external annular sealing lip of a seat retainer member;

FIG. 10a is a fragmentary longitudinal sectional view of a portion of the seat retainer shown in FIGS. 9 and 10 and showing deformation of an external annular sealing lip of the seat retainer during installation thereof;

Figure 1:
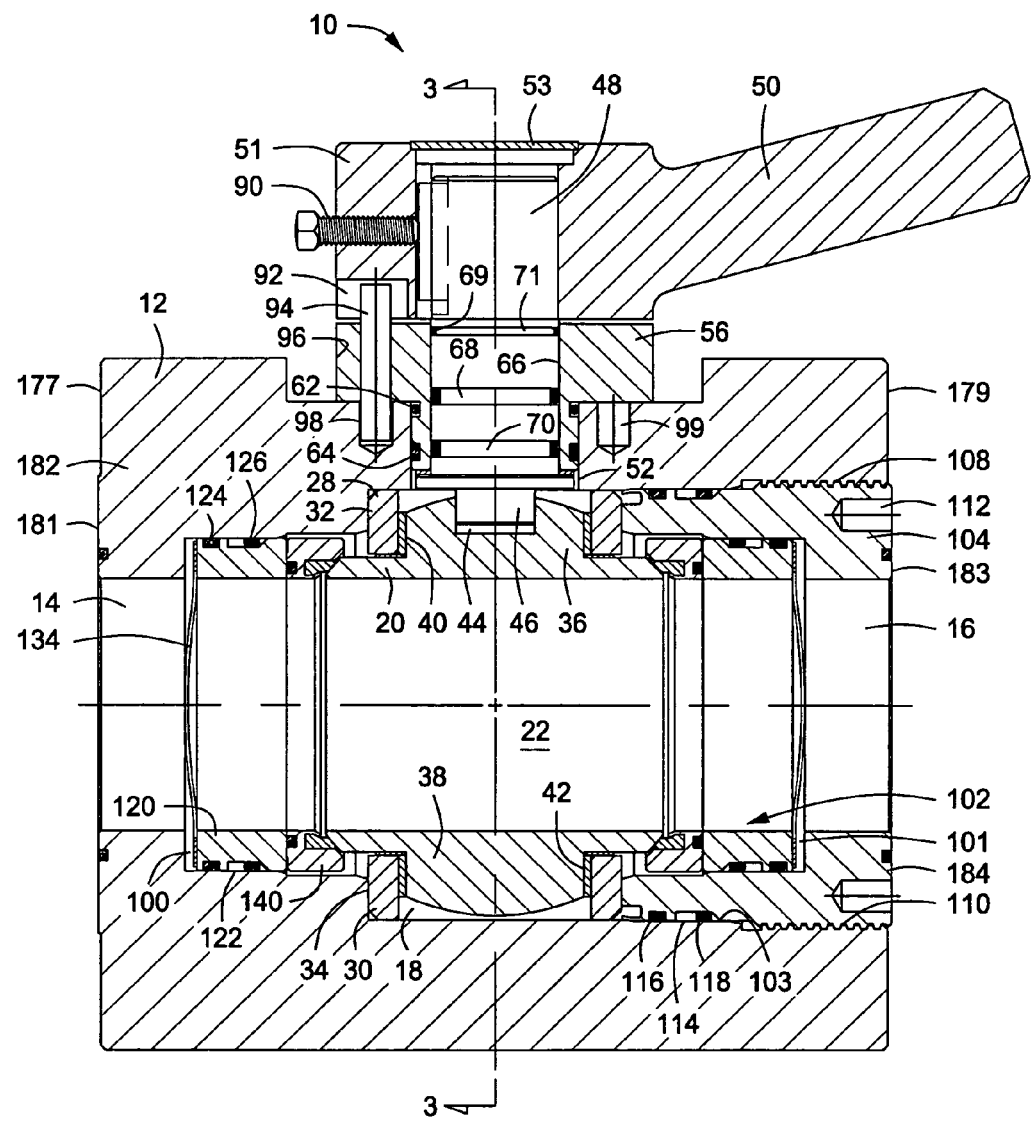
Figure 2:
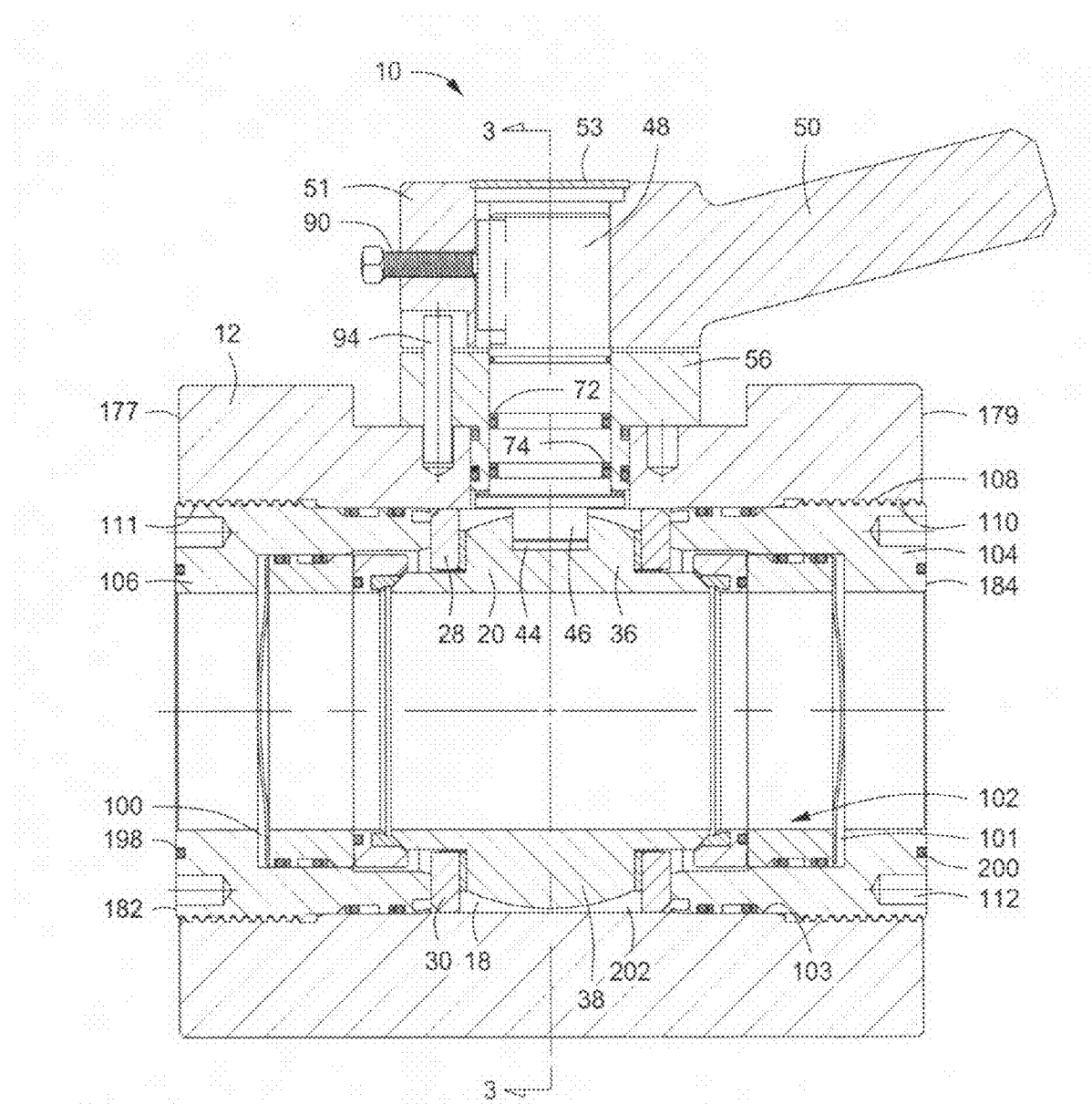
Figure 11:
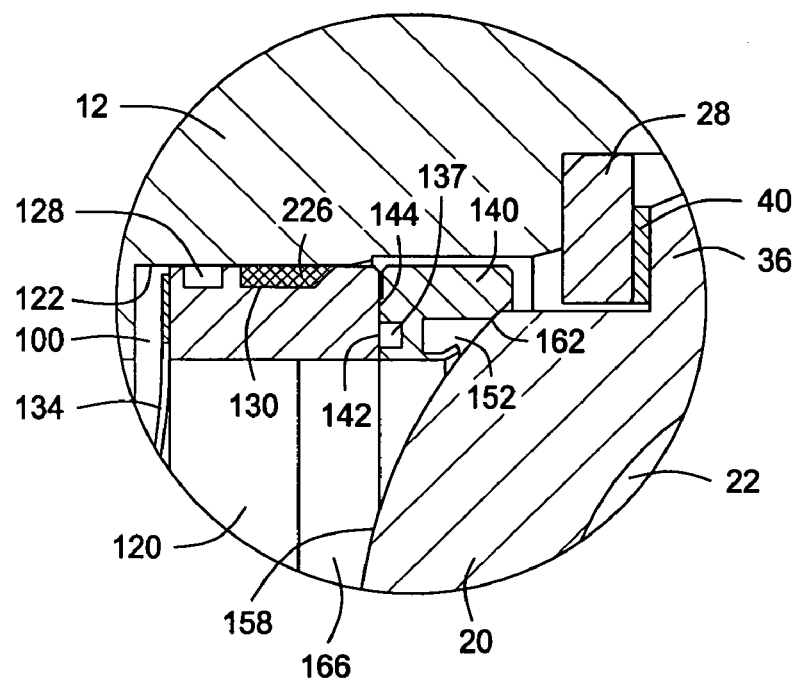
Figure 12:
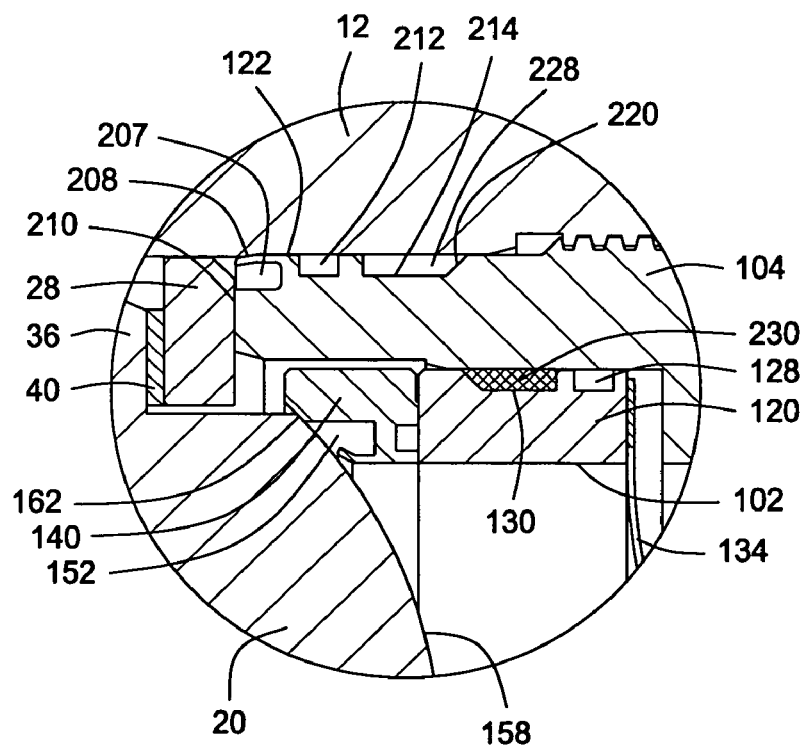
Figure 13:
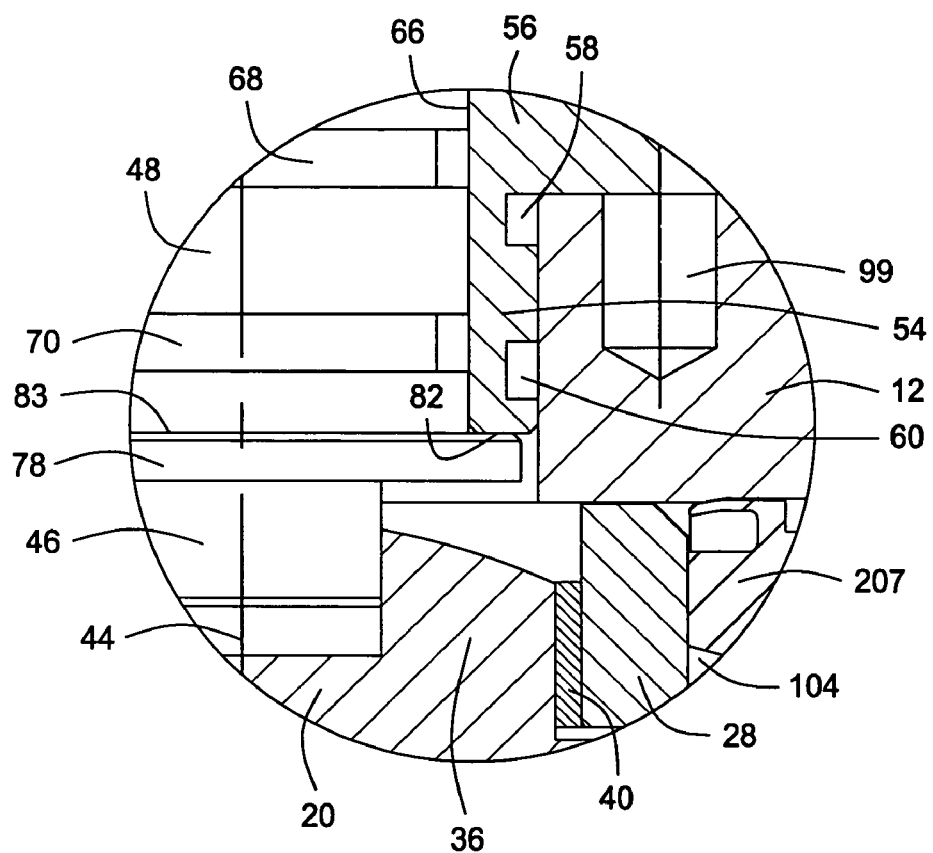
Figure 14:
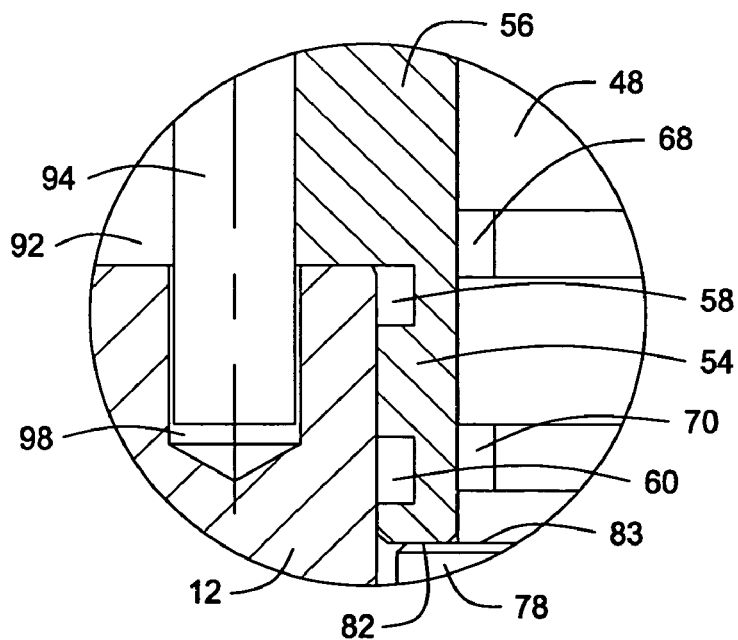
Figure 15:
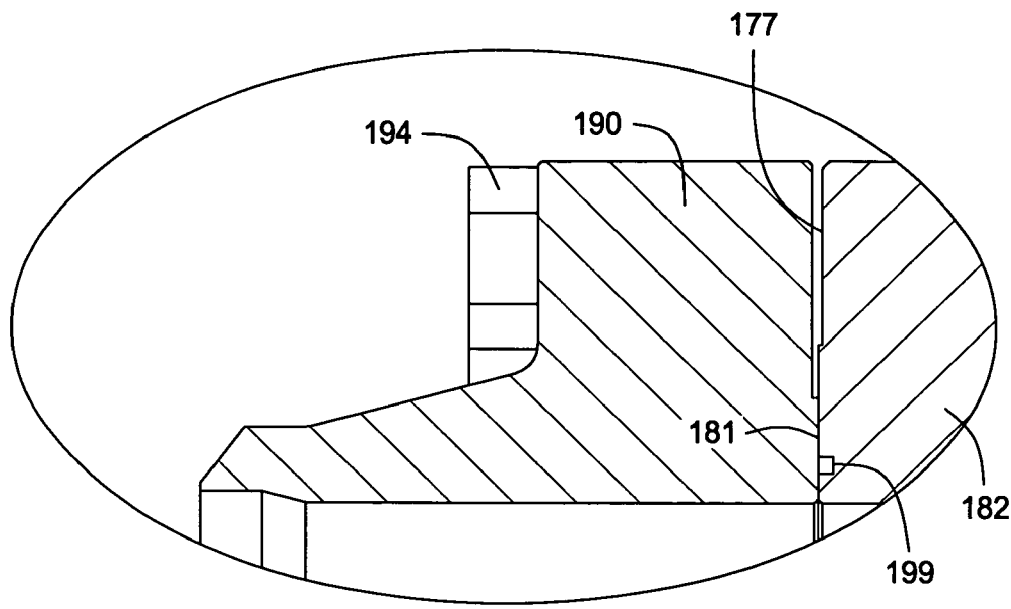
Figure 16:
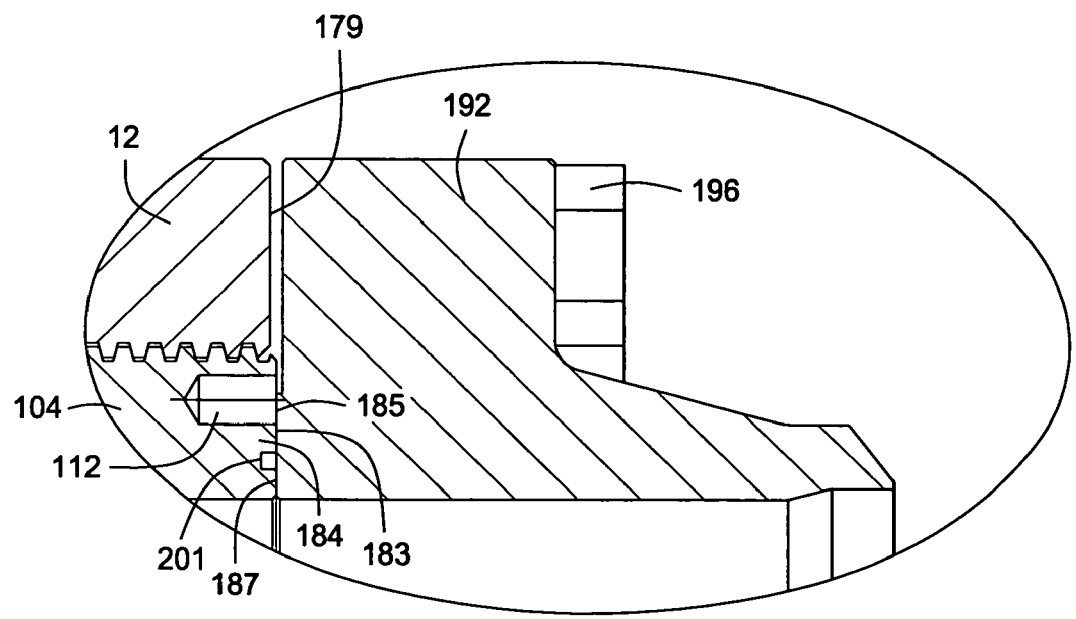
Figure 17:
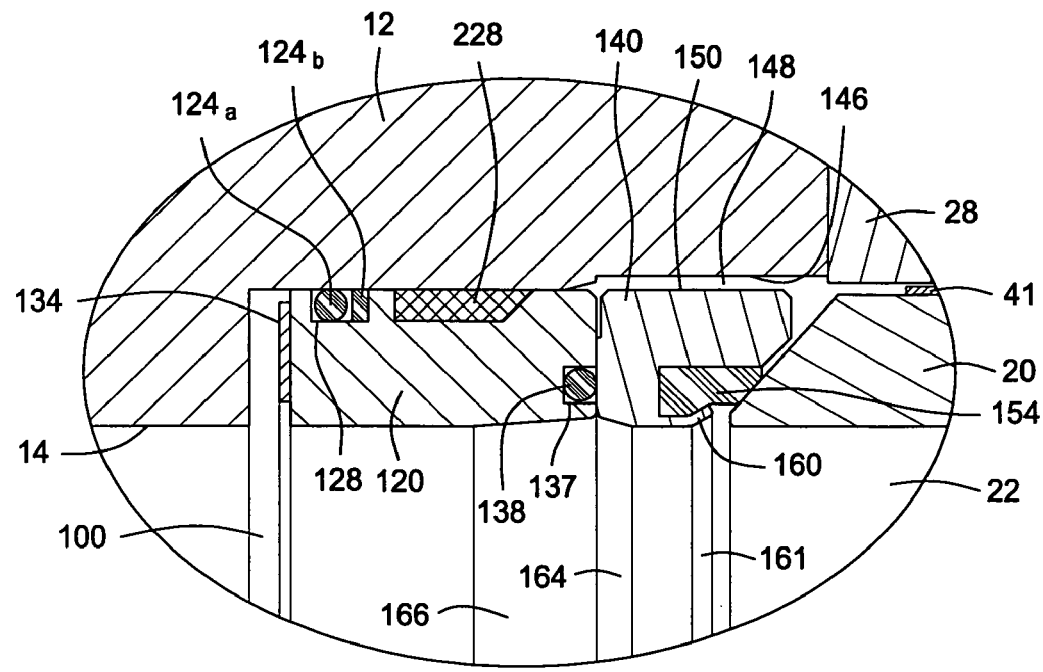
Figure 18:
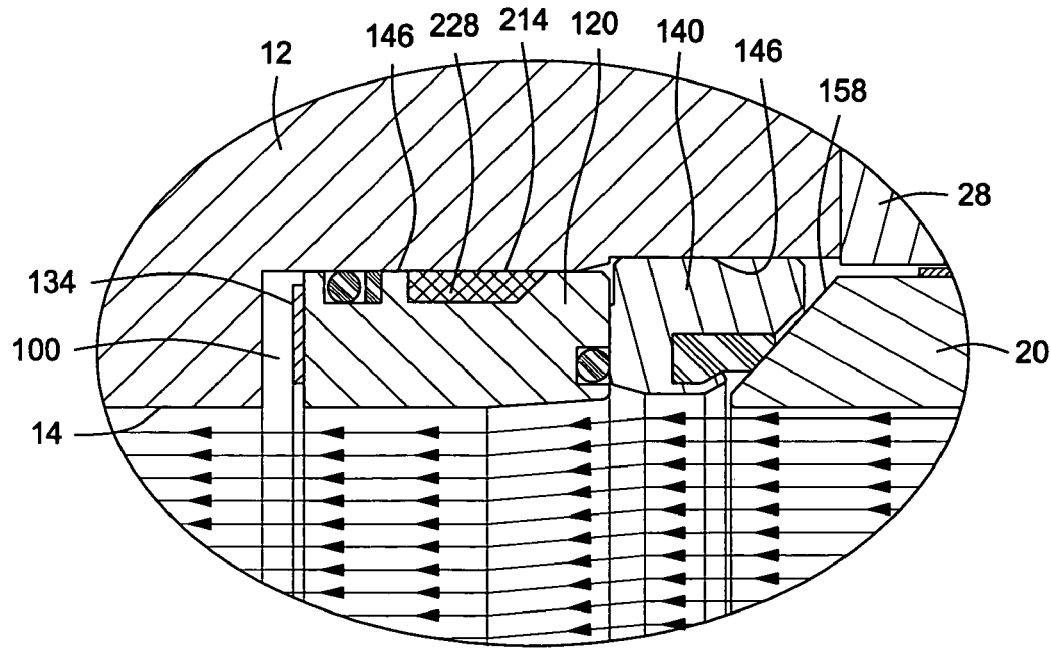

FIG. 11 is a partial sectional view a self-centering seat assembly of a trunnion mounted ball valve mechanism such as that shown in FIG. 1, being designed particularly for fire-safe sealing and causing metal-to-metal sealing contact of the seat ring with the valve ball member and metal-to-metal sealing contact of the seat actuator ring with the seat ring in the event of seal destruction by excessive heat and maintaining sealing of each seat actuator ring with the valve body by means of a high temperature resistant seal;

FIG. 12 is a partial sectional view a self-centering seat assembly of a trunnion mounted ball valve mechanism such as that shown in FIG. 2, being designed particularly for fire-safe sealing and causing metal-to-metal sealing contact of the seat ring with the valve ball member and metal-to-metal sealing contact of the seat actuator ring with the seat ring in the event of seal destruction by excessive heat and maintaining sealing of the seat retainer member with the valve body and sealing of the seat actuator ring with the seat retainer member by means of high temperature resistant seals;

FIG. 13 is a partial sectional view of the valve stem and stem packing assembly of the trunnion mounted ball valve mechanism of the present invention illustrating the maintenance of a metal-to-metal seal between a stem shoulder flange of the valve stem with the packing gland in the event of destruction of stem and stem packing seals by excessive heat;

FIG. 14 is another partial sectional view of the valve stem and stem packing assembly of the trunnion mounted ball valve mechanism of the present invention illustrating metal-to-metal sealing of the stem packing gland to the valve body in the event of seal destruction by excessive heat;

FIG. 15 is a partial sectional view showing mounting of a weld end flange to one end of the valve body in a manner that an annular surface of the weld end flange maintains metal-to-metal sealing with the valve body to prevent leakage under conditions of excessive heat;

FIG. 16 is another partial sectional view showing metal-to-metal sealing of a weld end flange to the seat retainer member of the valve mechanism;

FIG. 17 is a partial sectional view of the seat recess and seat assembly region of the valve mechanism and illustrates the centered position of the seat member with respect to the spherical sealing surface of the valve ball member and further illustrates the clearance that exists between the outer periphery of the seat member and a wall surface of the seat recess; and FIG. 18 is a similar partial sectional view as compared with FIG. 17 and illustrates a maximum laterally off-center shifted position of the valve seat member so that it is in contact with the adjacent wall surface of the seat recess; the FIG. further showing the flow of fluid through the valve.

DETAILED DESCRIPTION OF PREFERRED EMBODIMENT

Figure 3:
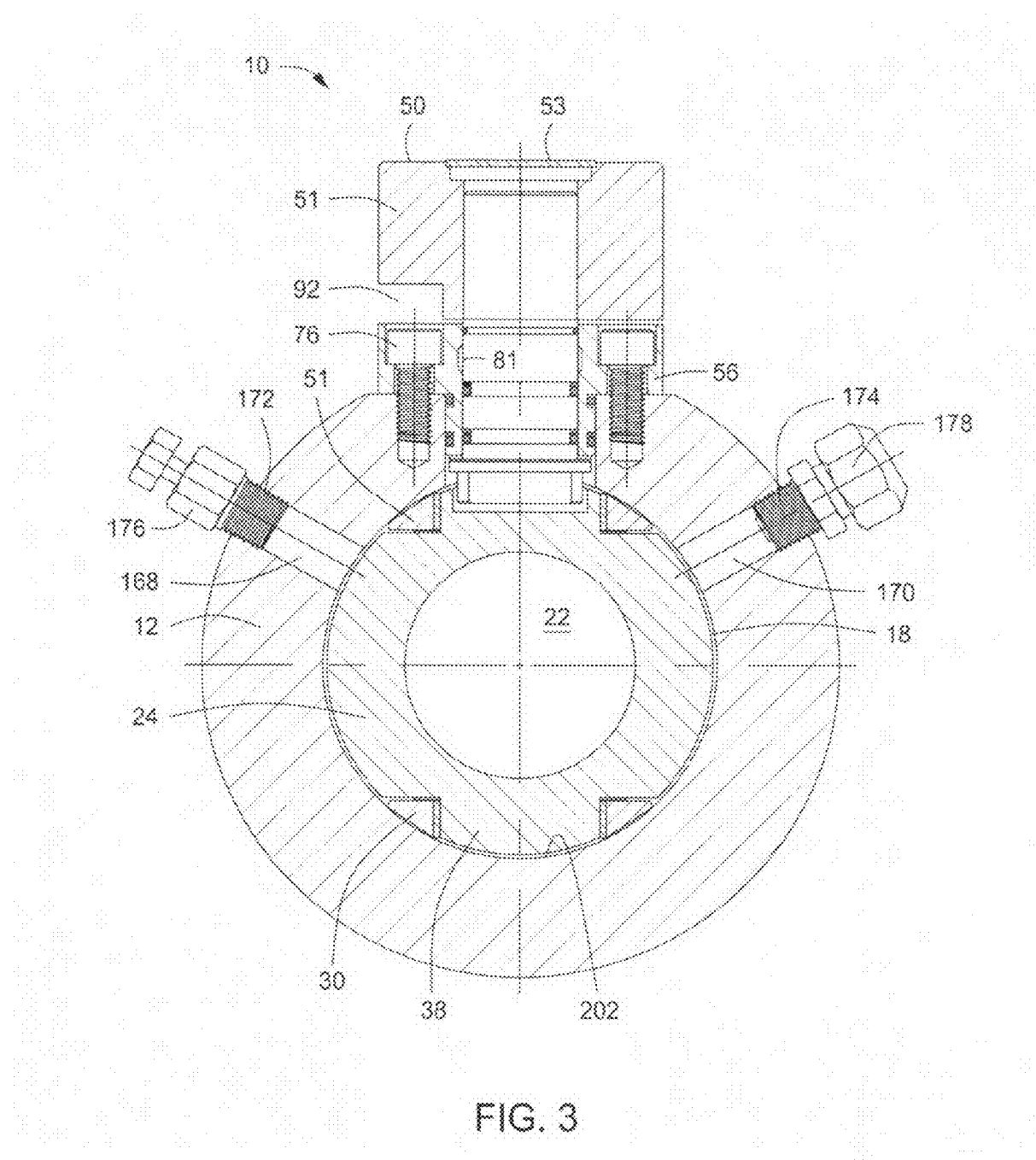

Referring now to the drawings and first to FIGS. 1-6, a trunnion type ball valve having self-centering seats is shown generally at 10 and is constructed according to the principles of the present invention. The ball valve 10 incorporates a valve body 12, which can be an integral or one piece body as shown in FIGS. 1 and 3, or may have two or more connected body sections as is common in the valve industry. The valve body defines flow ports 14 and 16, one or both of which are defined by seat retainer members as discussed in greater detail below. The flow ports 14 and 16 are in communication with a valve chamber 18 that is defined by the valve body 12. A valve ball member 20 is located within the valve chamber 18 and is rotatably moveable to an open position where a flow passage 22 of the valve ball member is in fluid flow communication with the flow ports 14 and 16 and a closed position where fluid flow communication between the flow ports and flow passage is blocked by opposed wall structure 24 and 26 of the valve ball, shown in FIGS. 3 and 6.

Annular trunnion support members 28 and 30 are located within the valve chamber 18 and are disposed in supported engagement with corresponding support shoulders 32 and 34 that are defined by the valve body and form portions of the internal valve body surfaces defining the valve chamber. Trunnion members 36 and 38 of the valve ball member 20 are located within the respective annular trunnion support members 28 and 30 and serve to permit rotational movement of the valve ball member to its open and closed positions and to prevent lateral movement of the valve ball member within the valve chamber. Annular trunnion bearings 40 and 42 are interposed between the trunnion members and the trunnion support members to minimize valve wear and operating torque as the valve ball member is rotated to its open and closed positions. As shown in the enlarged fragmentary sectional view of FIG. 8, thrust bearings 41 are interposed between the annular trunnion support members and annular thrust shoulders 43 of the valve ball member 20, surrounding the respective trunnion members of the valve ball.

Trunnion member 36 is machined or otherwise formed to define a non-circular stem drive receptacle 44 within which is received the non-circular rotary drive element 46 of a valve stem 48, thus establishing a non-rotational relationship between the valve stem 48 and valve ball 20. Upon rotational movement of the valve stem by movement of an actuating handle 50 that is mounted in fixed relation to the valve stem, the valve ball member is also rotated toward its open or closed position depending on the direction of valve stem rotation.

Figure 4:
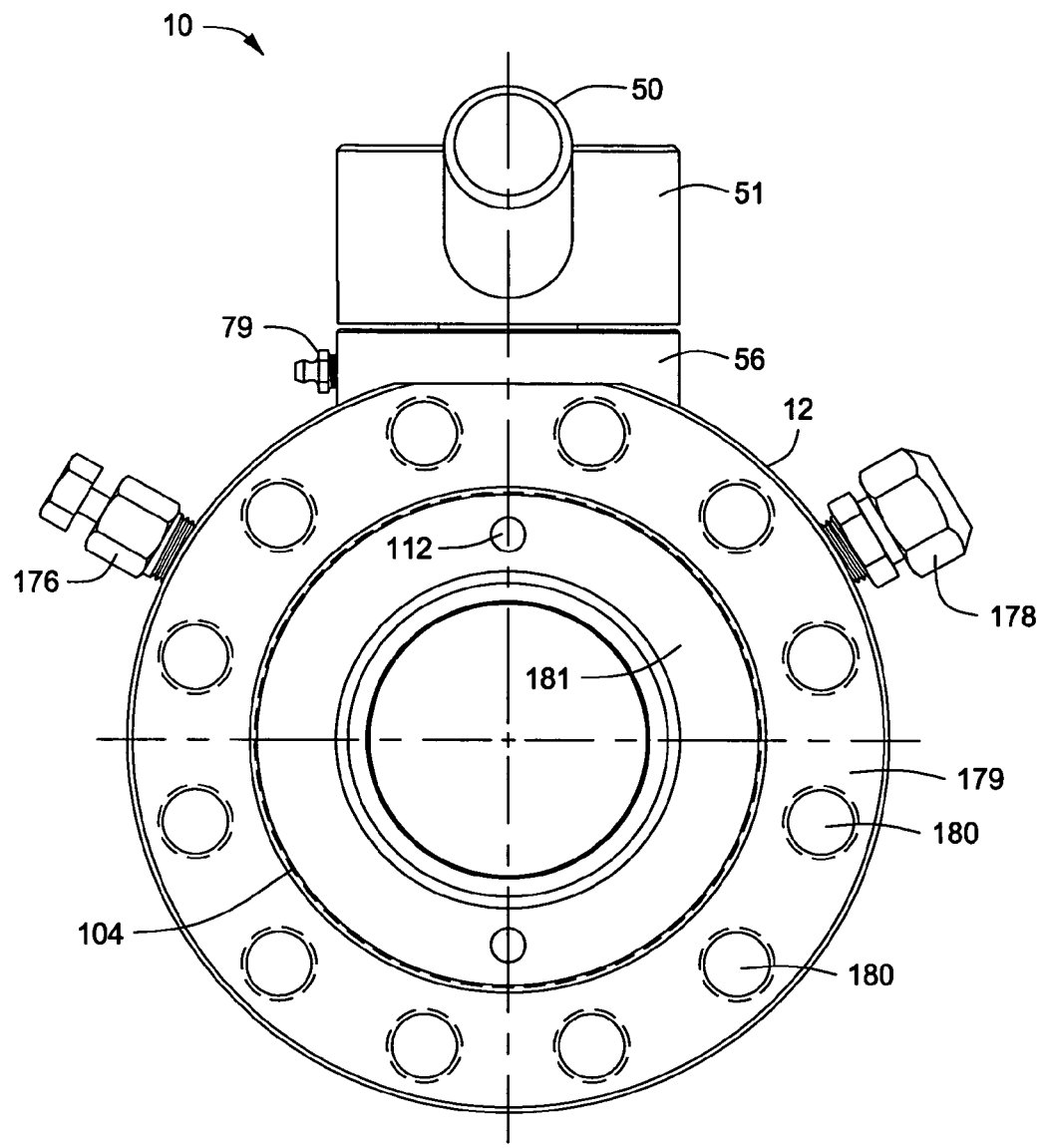
Figure 5:
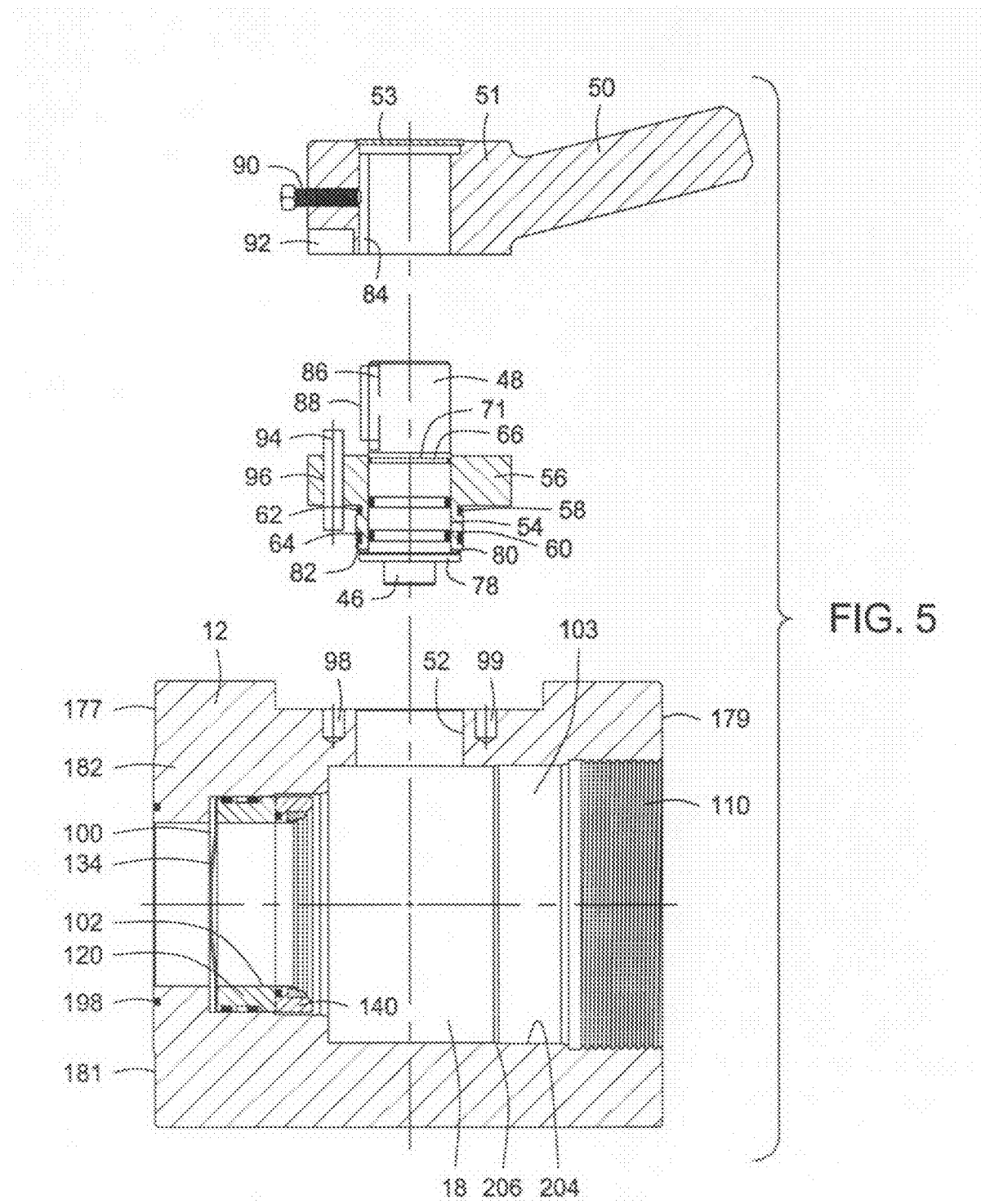

The valve body 12 defines a stem and packing gland passage 52 within which is positioned a tubular seal carrier 54 of a packing gland 56, shown best in the exploded sectional view of FIG. 5. The tubular seal carrier of the packing gland defines annular seal grooves 58 and 60 containing annular sealing elements or annular sealing assemblies 62 and 64, for establishing sealing of the sealing gland with the generally cylindrical wall of the stem and packing gland passage 52. An annular high pressure sealing assembly is shown at 64 and includes an O-ring type resilient sealing member and a higher durometer annular sealing member of rectangular cross-sectional configuration within the annular seal groove 60. Thus, the sealing assembly of the tubular seal carrier 54 readily resists the maximum pressure for which the valve mechanism is designed. The packing gland 56 and its seal carrier 54 define a stem passage 66 of generally cylindrical configuration through which the valve stem 48 extends. Seal grooves 68 and 70 of the valve stem 48 contain annular sealing elements or sealing assemblies 72 and 74 which establish sealing of the valve stem 48 with the generally cylindrical internal wall of the stem passage 66. Reference numeral 74 identifies an annular high pressure sealing assembly having an O-ring type resilient sealing member and a higher durometer annular sealing member of rectangular cross-sectional configuration within the annular seal groove 70 of the valve stem to prevent leakage along the valve stem at maximum working pressure. As shown in FIG. 3, the packing gland 56 is retained in immoveable assembly with the valve body 12 by means of a plurality of retainer bolts 76. To ensure that the valve stem cannot be forced by the internal pressure of the valve to move from its installed position within the stem passage 66, the valve stem 48 is provided with an integral annular flange 78 that engages an annular stem bearing 80 through which force is transmitted from the annular flange 78 to an annular stop shoulder 82 defining the lower or inner end of the tubular seal carrier 54. The annular stem bearing 80, which is typically composed of a low-friction polymer material, also serves to minimize the torque force that is needed at all pressure ranges of valve operation to impart opening or closing movement of the valve mechanism. For lubrication of the valve stem and for the purpose of providing for a lubricant enhanced stem sealing capability the packing gland is provided with a lubricant injection fitting 79, shown in FIG. 4, which is threaded into the outer portion of a lubricant passage in communication with an internal annular lubricant groove 81 of the packing gland which is shown in FIG. 3. The lubricant is confined within the packing gland by the annular sealing member 62 of the valve stem 48 and by a lubricant containment seal 69 that is located within another annular seal groove 71 of the valve stem.

It is desirable to mount the valve actuating handle 50 in non-rotatable relation with the valve stem 48, thus ensuring that rotation of the valve actuating handle 50 imparts like rotational movement to the valve stem and thus to the valve ball member 20. One suitable form for accomplishing this feature conveniently takes the form of a key or spline type locking system. As shown in FIG. 5, the operating handle 50 defines an internal keyway slot 84 and the outer portion of the valve stem 48 defines a like keyway slot 86. A key member 88 is positioned within the aligned keyway slots and is secured in place by means of a set screw 90 which is threaded into the hub portion 51 of the valve actuating handle 50. The key and keyway arrangement establishes a non-rotatable relationship of the valve actuating handle with the valve stem. To protect the interior of the hub 51 from contamination by dust and other debris a dust cap 53 is fitted into a dust cap recess at the outer portion of the stem passage.49 of the hub 51.

It is desirable to provide a simple and efficient system for ensuring that the valve mechanism achieves approximately 90° rotational movement to its open and closed positions by movement of the actuating handle 50. This feature is accomplished by providing the hub portion 51 of the actuating handle 50 with a valve positioning recess 92 having a movement arc of substantially 90°. A positioning pin 94 extends through a pin passage 96 of the packing gland 56 and has an end portion thereof engaged within a positioning pin receptacle 98 of the valve body 12. The opposite or outer end of the positioning pin 94 projects into the valve positioning recess 92 and serves as an actuating handle rotation stop which is contacted by the respective end surfaces of the 90° arcuate valve positioning recess 92. Therefore, a worker will need only to grasp the actuating handle and rotate it until it reaches the stop shoulder at one end of the arcuate valve positioning recess 92 to properly position the valve mechanism at its open or closed position. The valve body 12 defines an additional positioning pin receptacle 99 which is offset 180° from the positioning pin receptacle 98. This feature permits the actuating handle to be assembled to the valve body at either of two selected positions so that the actuating handle 50 may be aligned longitudinally with the valve body to indicate the open position of the valve mechanism. This feature also permits selective positioning of the actuating handle to accommodate conditions where adjacent objects such as walls, pipes or other valves may prevent rotary valve operating handle movement for controlling valve operation.

The valve body 12 defines a pair of seat recesses 100 and 101, one of which may be defined within the valve body and the other may be defined within a seat retainer member 104. Within each of the seat recesses annular seat assemblies, shown generally at 102, are positioned for movement according to mechanical and pressure conditions that are present at any point in time. The seat retainer members are deemed to be component parts of the valve body though they are removably mounted within the valve body. The valve body defines axial ends, with one of the axial ends defining a seat retainer receptacle 103 as shown in FIGS. 1 and 2 or with both of the axial ends defining seat retainer receptacles as shown in FIG. 2. As shown in FIG. 2, the valve body is provided with two seat retainer members 104 and 106 each being in threaded assembly with a valve body member and each defining one of the two seat recesses 100 within the valve. Though the seat retainer members are shown to be in threaded connection within the seat retainer receptacle or receptacles 103 it should be borne in mind that the seat receptacles may be mounted to the valve body in any other suitable fashion without departing from the spirit and scope of the present invention. Referring again to FIG. 1, the seat retainer member 104 is provided with an externally threaded section 108 that establishes threaded engagement with an internally threaded section 110 within the valve body 12 and defines spanner openings 112 that permit assembly of the seat retainer member to the valve body by means of a simple spanner wrench. The seat retainer member 104 is sealed to an internal annular surface 114 of the valve body by means of resilient O-ring seals or other suitable annular seal assemblies 116 and 118 which are contained within respective external annular seal grooves of the seat retainer member.

Figure 8:
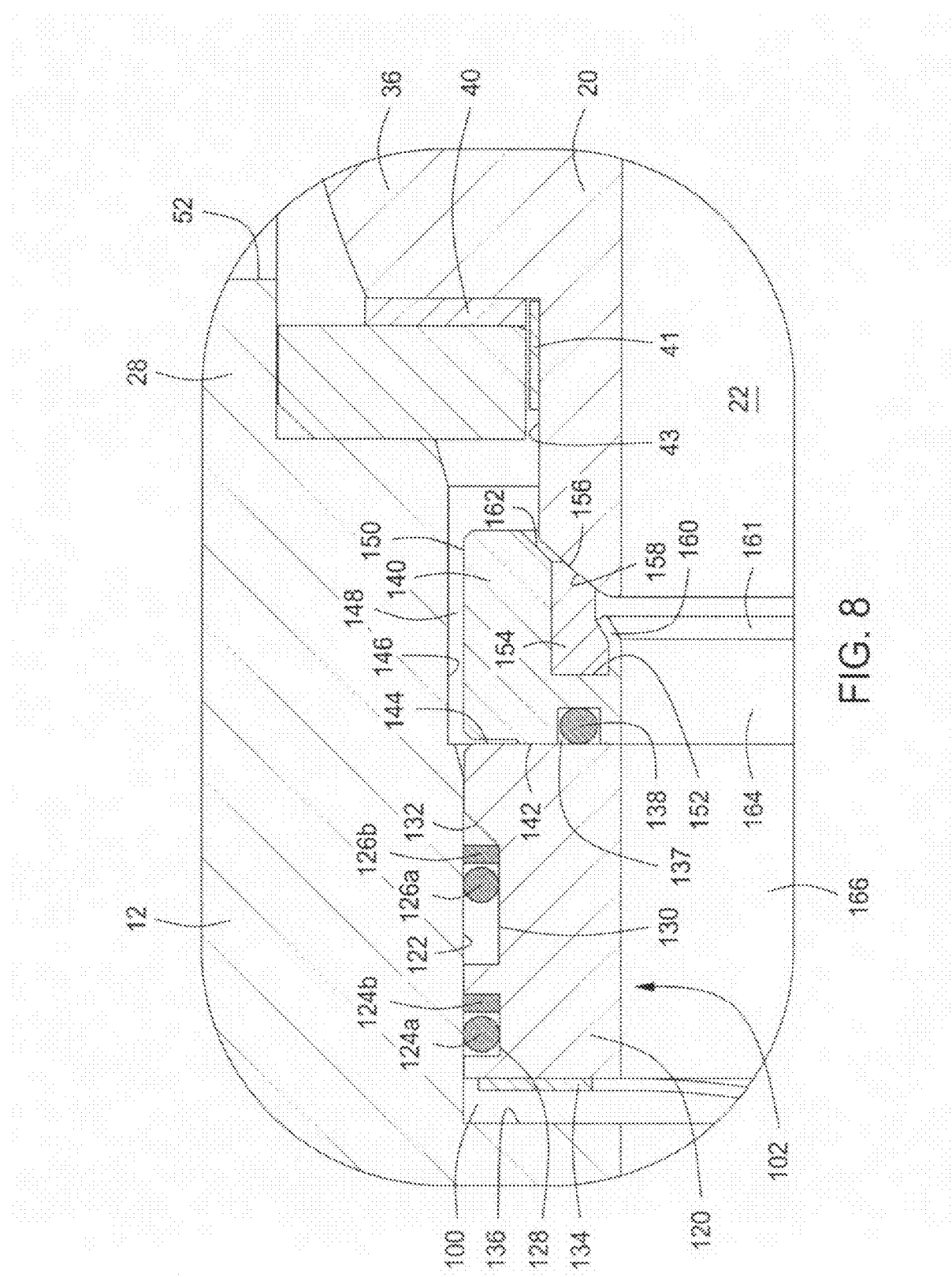

As shown in FIGS. 1, 2, 5 and 6 and in greater detail in FIG. 8, an annular seat support member 120 is positioned for linear movement within the seat recess 100 and is sealed to a cylindrical wall surface 122 of the seat recess by means of annular resilient seals or seal assemblies 124 and 126 that are contained within annular seal grooves 128 and 130 of the seat support member. The annular seat support member has an external dimension that is only slightly smaller as compared with the internal dimension of the annular seat recess adjacent thereto, thus permitting linear movement of the annular seat support member within the seat recess but preventing any substantial lateral movement. As shown in FIG. 8 the seal assembly 124 of FIG. 1 comprises a resilient annular seal ring 124a of circular cross-sectional configuration and a back up seal ring 124b of rectangular cross-sectional configuration. In similar fashion the seal assembly 126 of FIG. 1 comprises a resilient annular seal ring 126a of circular cross-sectional configuration and a back-up seal ring 126b. Each of the annular seal rings and back-up seal rings is subjected to compression between the cylindrical seat recess surface 122 and the cylindrical seal groove surfaces 128 and 130 so that the annular seat support member is maintained in sealed relation with the valve body at all pressure conditions. Typically the back-up seal rings will be composed of a harder or higher durometer sealing material as compared with the hardness of the resilient seal rings, though the back-up seal rings may be composed of a different sealing material or a metal or composite sealing material if desired. The seal rings or seal assemblies are capable of linear movement within the respective annular seal grooves, this movement being limited by the axial length of the seal grooves. It should be noted that the seal groove 130 is of significantly greater length as compared with the annular seal groove 128 and the seal groove 130 is defined in part by a tapered groove end surface 132. In the event exceptionally high pressure conditions occur the back-up seal ring can be essentially wedged between the tapered groove end surface 132 and the cylindrical surface 122 of the seat recess 100 so that the sealing capability of the seal will become increased in direct response to higher pressures.

One or more spring members, such as an annular wave spring 134, is positioned within the seat recess 100 and is in force transmitting relation with an annular shoulder surface 136 of the seat recess and with the annular seat support member 120. The annular seat support member 120 defines an annular seal groove 137 within which is located an annular resilient seal member 138. The wave spring member is designed to develop a spring force on the annular seat support member 120 that is only sufficient to maintain the respective seat member of the valve in light sealing contact with the spherical sealing surface of the valve ball member. This feature causes the seat members of the valve mechanism to be sealed at all pressure conditions, including zero pressure.

An annular seat member 140 is located within the seat recess 100 and defines an annular back face surface 142 that is disposed in engagement with the annular resilient seal member 138 and also engages a portion of the face surface 144 of the annular seat support member 120. In the region of the annular seat member 140 the seat recess 100 is defined in part by an enlarged generally cylindrical surface section 146 and an annular clearance 148 exists between the enlarged cylindrical surface 146 of the seat recess and the generally cylindrical outer surface 150 of the annular seat member 140. This feature permits the annular seat member to have the capability for lateral movement within the seat recess, this lateral movement being limited by the annular clearance 148. This lateral movement capability of the annular seat member 140 permits the seat member to be "self-centering" so that it achieves optimum positioning within the seat recess and relative to the valve ball member. Though the annular valve seat members are capable of self-centering movement to positions where the center thereof is off-set with respect to the centerline of the flow passages, the inner peripheries of both the seat support members and valve seat members are configured to ensure smooth flow through the valve and to ensure that no abrupt edges are presented that might develop turbulence in the flowing fluid or interfere with passage of cleaning devices through the flow passages. The self-centering and smooth flow features of the seat assemblies are explained in greater detail below in connection with the fragmentary sectional views of the fire-safe embodiment of FIGS. 17 and 18.

The annular seat member 140 has an annular face seal groove 152 within which is located an annular face seal member 154. The face seal member 154 may be composed of any one of a wide variety of sealing materials including elastomer sealing materials, polymer sealing materials, metal sealing materials of composites of various sealing materials that are deemed suitable for the character of valve service that is intended. The face seal member 154 defines an annular tapered face sealing surface 156 that is disposed in sealing engagement with the spherical external sealing surface 158 of the valve ball 20. The thickness dimension of the face seal member is greater at its rear portion away from the valve ball member as compared with the forward portion adjacent the valve ball member. An annular seal retainer lip 160 of the seat member 140 is deformed to an angular position by bending and establishes retaining engagement with the seal member 154. The seal retainer lip retains the seal member against being displaced from its seal groove by the flowing fluid medium and also protects the seal member from being extruded or otherwise moved to a position where it is subject to being cut, eroded or otherwise damaged as the valve ball is rotated particularly toward its closed position.

As indicated above, it is to be borne in mind that the seat assemblies of the present invention are designed to establish light sealing engagement with the spherical sealing surface 158 of the valve ball member under zero pressure conditions and is adapted for pressure responsive sealing so that the sealing integrity of the valve mechanism is directly responsive to any fluid pressure that is present within the valve. The face seal member 154 establishes sealing with the spherical sealing surface 158 of the valve ball member and defines a first pressure responsive area "$A_1$", shown best in FIG. 8. The annular resilient seal member 138 establishes sealing engagement with the annular back face surface 142 of the annular seat member and establishes a second pressure responsive area "$A_2$" which is of greater dimension as compared with the first pressure responsive area "$A_1$". Fluid pressure within the valve body acts on the first and second pressure responsive areas and develops a pressure responsive force differential acting in the direction of the valve ball member. This pressure responsive force differential is intended to be fairly small. The annular seals 124a, 124b, 126a and 126b establish sealing with the cylindrical wall surface 122 of the seat recess 100 and establish a third pressure responsive area "$A_3$" which is of greater dimension as compared with the second pressure responsive area. Fluid pressure within the valve acting on said first, second and third pressure responsive areas establishes a resultant force differential acting in the direction of the valve ball member. This force differential urges the annular seat support member and the valve seat member toward the valve ball member and establishes sealing integrity of the annular seat member with the spherical sealing surface of the valve ball member that is directly proportional to the fluid pressure that exists within the valve mechanism.

In addition to the tapered seal retainer lip 160, the annular seat member 140 also defines a tapered face surface 162 which is normally disposed in spaced relation with the spherical sealing surface 158 of the valve ball member 20. However, in the event of excessive seal wear, erosion or damage the annular tapered face surface 162 can be moved into metal-to-metal sealing engagement with the spherical sealing surface.

To ensure that no abrupt shoulder surfaces of the annular seat member 140 or the annular seat support member 120 are exposed within the flow passage of the valve as the result of lateral shifting of the seat member as shown in FIG. 18, the seal retainer lip 160 of the seat member defines internal annular tapered surfaces 161 and 164. These internal annular tapered surfaces serve as guide or flow control surfaces to ensure that no objects being passed through the flow line for cleaning will tend to become lodged within the valve mechanism. These internal annular tapered surfaces also serve to establish smooth flow of fluid through the valve and to minimize the potential for development of turbulence that might otherwise impede fluid flow. In like fashion, the annular seat support member 120 defines a tapered internal surface portion 166 which is oppositely tapered as compared with the taper of surface 164. The internally and oppositely tapered transition of the seat support member and the seat member permits line cleaning devices or objects such as scrapers, balls and pigs to be passed through the valve mechanism along with the flowing fluid for the purpose of dislodging and removing any debris or deposits that might be present within the flow line and valve. The tapered transition also minimizes the potential for the development of turbulence within the valve which might interfere with optimum flow conditions of the valve. The features of lateral seat shifting for self-centering and for maintaining smooth flow conditions through the valve mechanism are illustrated particularly in FIGS. 17 and 18 and explained in further detail below.

As mentioned above, the primary difference between the longitudinal sectional views of FIGS. 1 and 2 is that the seat recess 100 of the embodiment of FIG. 1 is formed directly in the valve body 12 while in FIG. 2 the valve body defines a pair of internal threaded sections 110 and 111 each having a seat retainer member 104 and 106 threaded therein. Like components of the two embodiments are indicated by like reference numerals. In each case a pair of seat recesses 100 are defined either by the valve body or by the seat retainer members 104 and 106 and are each of the configuration and purpose that is described in detail concerning FIG. 8 and also shown in FIGS. 11, 12, 17 and 18. The seat assemblies, shown generally at 102, each include a wave spring 134, an annular seat support member 120 and an annular seat member 140 and are substantially identical within each seat recess regardless whether the seat recess is defined within the valve body structure as shown in FIG. 1 or is defined within one or both seat retainer members as shown in FIGS. 1 and 2 and other FIGS. of the drawings.

Figure 7:
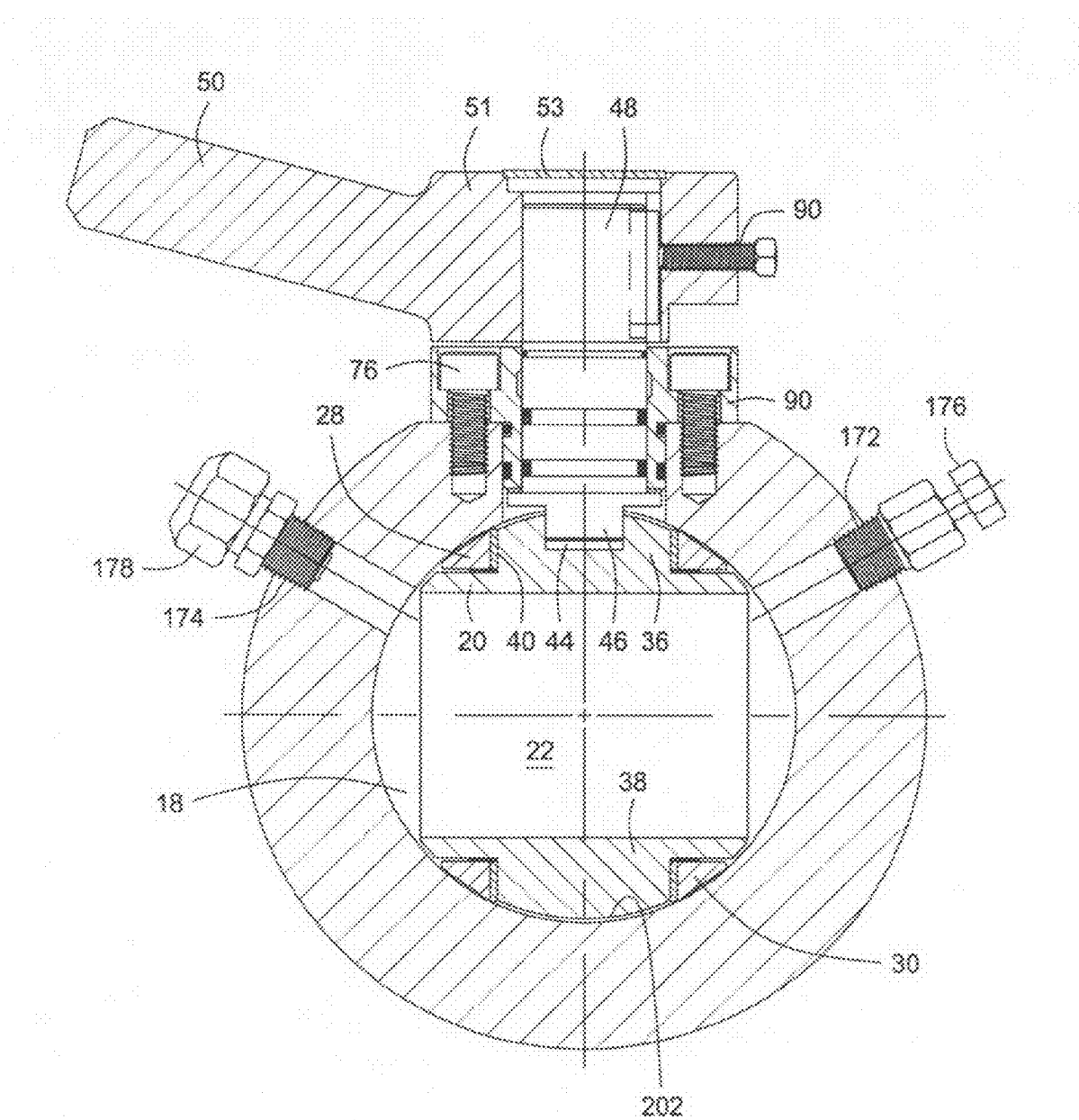

As shown in FIGS. 3, 4 and 7, the valve body defines passages 168 and 170 that are each in communication with the valve chamber 18 and are each provided with an internally threaded section 172 and 174. A pair of fittings, such as pressure bleed fitting 176 and a lubricant injection fitting 178, are threaded into the passages 168 and 170 as shown. To bleed pressure from the valve chamber and thereby confirm if seat leakage is occurring, the pressure bleed fitting is actuated to its bleed position by using a simple wrench. In the event lubricant injection is needed to ensure the sealing capability of the valve mechanism a lubricant supply conduit is connected with the fitting 178 and the fitting is actuated to its open or lubricant injecting condition to permit lubricant to be injected through the fitting and into the valve chamber.

Figure 6:
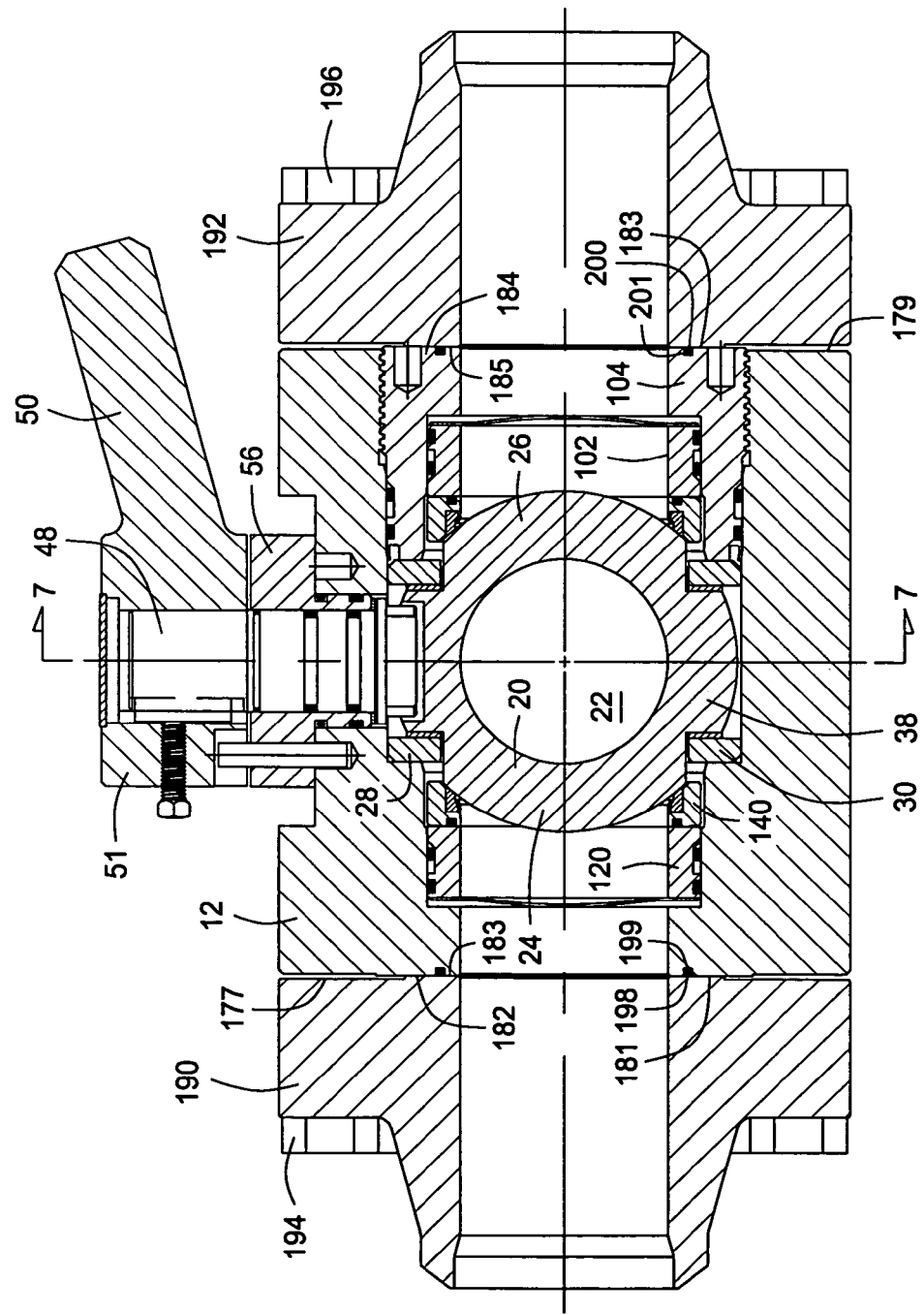

With reference to FIGS. 4 and 6, for connection of the ball valve mechanism within a flow line the valve body 12 is provided at each annular end surface 177 and 179 thereof with a plurality of internally threaded bolt holes 180 and defines annular axially extended portions 182 and 184 each projecting beyond the axial end surfaces and defining annular flange sealing faces 181 and 183 against which similar annular axially extending projections of pipe mounting flanges are secured in metal-to-metal sealing engagement upon tightening of the flange retainer bolts. It should be borne in mind that the annular axially extended portions 182 and 184 of the valve body 12 may be defined as an integral part of the valve body as shown at the left side of FIG. 1 or may be defined by an axially projecting end portion of the seat retainer member 104 as shown at the right side portion of FIGS. 1, 2 and 6. When two seat retainer members are employed as shown in FIG. 2 the annular axially extended portions 182 and 184 and the flange sealing surfaces 181 and 183 will be defined by the respective exposed outer axial ends of the seat retainer members. The pipe flanges establish metal-to-metal sealing with the flange sealing surfaces 181 and 183 of the axial projections at the ends of the valve body. Resilient seals 198 and 200 are retained within annular seal grooves of the pipe mounting flanges, or seal grooves of the valve body if desired, to provide additional resilient sealing of the pipe mounting flanges to the valve body.

As shown in FIG. 6, a pair of pipe connection or mounting flanges 190 and 192 are connected in sealed relation with the valve body by means of a plurality of retainer bolts 194 and 196 that extend through bolt holes of the pipe connection flanges and are threadedly received within the bolt holes 180. As shown in FIG. 6 the pipe connection flanges are configured as weld end flanges which are intended to be connected to pipe members of a flow line by welding. However, it should be borne in mind that any of a number of pipe connection systems may be employed without departing from the spirit and scope of this invention.

The pipe connection flanges are each additionally sealed to the valve body by means of annular seal members 198 and 200 which are contained within annular seal grooves 199 and 201 at the respective axial ends of the valve body. The line connection flanges 190 and 192 define axially projecting annular contact face portions 183 and 185 that are disposed respectively for metal-to-metal sealing engagement with the axially extended portions 182 and 184. The annular axially projecting or extending portions of the valve body and line connection flanges are each of substantially planar configuration so that metal-to-metal sealing will be established as the flanges are drawn to the axial ends of the valve body by the flange retainer bolts 194 and 196. The annular axially projecting or extending portions of the valve body and line connection flanges cause the outer peripheral portions of the line connection flanges to be disposed in spaced relation with the respective axial ends of the valve body, thus permitting slight flexing of the flanges by the force of the retainer bolts and causing the force of metal-to-metal sealing engagement of the axially projecting portions to be sufficiently great to prevent any leakage between the valve body and the line connection flanges.

Figure 9:
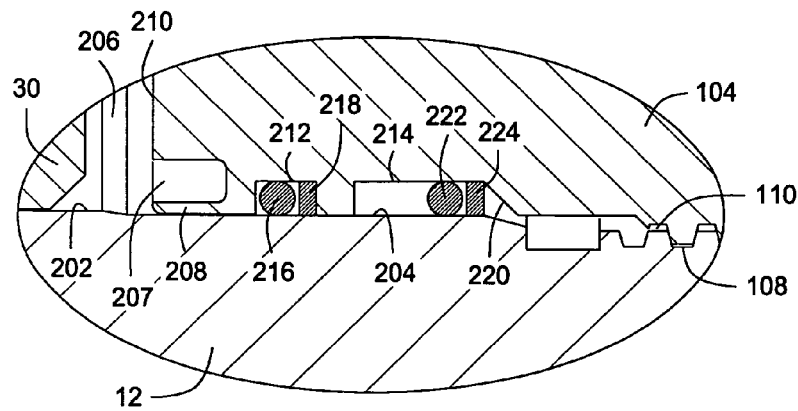
Figure 10:
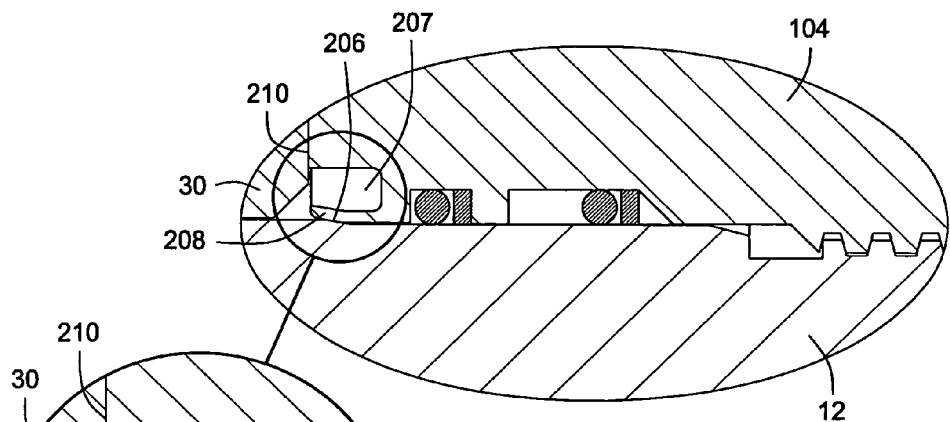
Figure 10A:
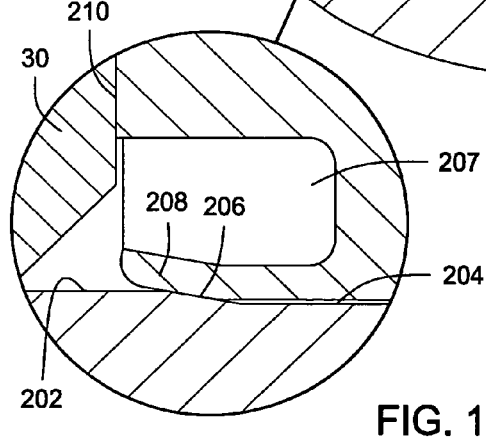

Referring now to FIGS. 9 and 10, the fragmentary sectional views show additional features of the seat retainer members 104 and 106. It should be noted that FIG. 9 is an assembly view showing the seat retainer member 104 being threaded toward its seated position within the valve body, but not completely seated, while FIG. 10 shows the completely seated condition of the seat retainer member within the valve body. The valve body 12 is formed internally to define an interior support surface 202 which is preferably of curved or cylindrical configuration and serves as a support surface for the trunnion support members 28 and 30. The interior support surface 202 has a defined dimension or diameter which is designed to provide proper seating and support for the trunnion support members. The valve body 12 is also formed internally to define an internal sealing surface 204 of substantially cylindrical configuration which is of slightly greater dimension or diameter as compared with the interior support surface 202. An annular internal tapered transition surface 206, having a taper in the range of about 10° relative to the surfaces 202 and 204, merges with the surfaces 202 and 204.

The inner axial end portion of the seat retainer member is formed to provide an annular groove 207, shown in FIGS. 10, 10a, 12 and 13, leaving an axially extending annular external lip 208 which is sufficiently thin to be deformable. The annular tapered transition surface 206 also functions as a cam surface or forming surface for deforming the annular lip 208 of the seat retainer member as the seat retainer member is threaded to its completely seated position within the valve body. The annular tapered transition surface 206 also functions as an annular sealing surface. It will be observed that the annular external lip 208 is of less axial length as compared with a seat retainer end surface 210, thus permitting the end surface 210 to move into supporting engagement with the trunnion support members 28 and 30 while the end of the annular external lip 208 remains clear of any contact with the trunnion support members. As the seat support members are moved from the position shown in FIG. 9 to the completely installed position of FIGS. 10 and 10a the annular external lip 208 will initially come into contact with the annular tapered transition or forming surface 206. Then as the seat retainer or retainers are moved further toward the trunnion support members by additional rotational threading movement thereof, annular external lip 208 will be deformed to the angulated position of FIGS. 10 and 10a by the camming or forming activity of the annular tapered transition surface 206. When the seat retainer members have been completely installed the deformed internal annular lip will have established metal-to-metal sealing relation with the annular tapered transition surface 206 which enhances the fire-safe characteristics of the valve. Thus, the sealed relation of the seat retainer members with respect to the valve body will be enhanced by this metal-to-metal seal. In the event an elevated temperature condition is encountered during valve service and exists for a sufficient period of time to destroy or degrade the seals of the valve mechanism, the metal-to-metal seal of the annular external lip 208 and the annular tapered transition surface 206 will minimize the potential for valve leakage.

For sealing of the seat retainer members with respect to the cylindrical sealing surface 204 of the valve body 12 external annular seal grooves 212 and 214. Seal assemblies are located within each of the seal grooves. The seal assembly of annular seal groove 212 comprises a resilient O-ring seal 216 which is maintained in compression between a groove bottom surface and the annular sealing surface 204. Additionally, an annular back-up seal 218 of generally rectangular cross-sectional configuration is located within the seal groove and is disposed for supported engagement with a groove end wall surface. The annular back-up seal can be of the same, lesser or greater durometer as compared with the durometer or hardness of the resilient O-ring seal. The back-up seal may be composed of rubber, a resilient rubber-like material, a polymer sealing material, a metal material or a composite of various sealing materials that are acceptable for the intended service conditions of the valve. The seal groove 214 is of significantly greater axial length as compared with the seal groove 212 and is defined at one axial end by an annular tapered shoulder surface 220. The seal assembly of the annular seal groove comprises an O-ring type resilient seal member 222 and an annular back-up seal 224 of generally rectangular cross-sectional configuration. The seal member 222 is maintained under compression between the bottom surface of the seal groove 214 and the cylindrical sealing surface 204. In the event high pressure conditions are encountered the back-up seal will be wedged or compressed against the tapered end shoulder surface 220, thus enhancing the sealing capability of the seal in direct response to the increased pressure.

It is desirable to provide the trunnion ball valve of the present invention with the capability for fire-safe service so that the valve mechanism will be resistant to leakage in the event the valve is subjected to elevated temperature for a sufficient period of time to destroy or degrade the resilient seals. The partial sectional view of FIG. 11 illustrates the left side portion of a trunnion ball valve such as is shown in FIG. 1 which has been modified for fire-safe service and which is shown without effective resilient seals, thus representing a heat damaged valve. Like components as compared with FIGS. 1 and 2 are indicated by like reference numerals. In place of a second seal assembly an annular heat resistant seal member 226 is shown to be present within the annular seal groove 130 of the seat support member 120 and maintains a seal with the generally cylindrical sealing surface 122 of the seat recess. Normally, elastomer or resilient seal rings or seal assemblies will be present within the annular seal grooves 128 and 137 to provide the sealing functions described above. In the event these seals are destroyed or degraded by heat to the point that their sealing capability is lost the heat resistant seal 226 will maintain effective sealing between the seat support member 120 and the valve body 12. The wave spring 134 will apply continuous force to the seat support member 120 causing its face surface 144 to maintain metal-to-metal sealing engagement with the back face surface 142 of the annular seat member 140.

Since the face seal member 154 of annular face seal groove 152 may be likewise damaged by excessive heat conditions the annular tapered surface 162 of the metal seat ring of the annular seat member 140 will be forced by the wave spring and by the force of differential pressure acting on the seat support member and seat member to maintain metal-to-metal sealing engagement with the spherical sealing surface 158 of the valve ball member 20. Any leakage through the closed valve mechanism will be within the limits of the standards for fire-safe testing.

With reference to FIG. 12 the fragmentary sectional view illustrates a fire-safe seal arrangement for the trunnion ball valve of the present invention which employs a seat retainer member such as that shown at the right side portion of FIG. 1 and shown at both the right and left side portions of the valve mechanism of FIG. 2. For purposes of simplicity, like components of FIG. 12 are identified by like reference numbers as compared with the valve mechanism shown in FIGS. 1, 2, 9, 10 and 10a. FIG. 12 illustrates the condition where the elastomer or polymer seals of the seat and seat retainer assembly have been subjected to a condition of elevated temperature, such as would be experienced during a fire. In this condition the seals of the seat and seat retainer have been destroyed or degraded to the point that the sealing capability thereof has been lost. The annular seal groove 214 of the seat retainer member 104 will be provided with a heat resistant seal 228 that will maintain sealing engagement with the seat retainer and with a generally cylindrical surface 204 of the seat recess which is shown in greater detail in FIGS. 9 and 10. Likewise, a heat resistant seal member 230 is located within the annular seal groove 130 of the annular seat support member 120 and serves to maintain the seat support member in sealed relation with respect to the seat retainer member in the event the elastomer or polymer seals are degraded or destroyed by excessive heat. Under this condition the tapered annular sealing surface 162 of the seat member 140 will have metal-to-metal sealing engagement with the outer spherical sealing surface 158 of the valve ball member 20. Thus the heat resistant seals cooperate with the metal-to-metal seals of the internal valve components to prevent or minimize valve leakage in the event the valve mechanism is subjected to excessive heat for a sufficient period of time to destroy or degrade the elastomer and/or polymer seals.

FIGS. 13 and 14 are representative of the condition of the valve stem and stem packing assembly of the valve mechanism under conditions where the elastomer or polymer seals thereof have been degraded or destroyed by excessive heat. Like components of these FIGS. have been identified by like reference numerals as compared with FIGS. 1-7. In the event the annular seals of seal grooves 58 and 60 of the tubular seal carrier 54 of the packing gland 56 and the annular seals of the valve stem seal grooves 68 and 70 should be destroyed by excessive heat it is appropriate to facilitate sealing of the valve stem 48 to the packing gland to minimize the potential for valve stem leakage that might feed a fire with a combustible fluid medium from the valve. It should be borne in mind that the valve stem thrust bearing 80 which is best shown in the exploded sectional view of FIG. 5 will likely be destroyed or degraded by heat as well, since it is preferably composed of a low friction polymer material such as Teflon® or any one of a number of similar low friction bearing materials. Thus, FIGS. 13 and 14 a valve stem thrust bearing is not shown between the annular thrust shoulder 83 of the valve stem. Instead, as would be the case if the valve stem thrust bearing were destroyed, internal pressure within the valve chamber acting on the valve stem, as shown in FIGS. 13 and 14, would tend to move the valve stem upwardly. As this valve stem movement occurs the annular thrust bearing shoulder surface 83 of the annular flange 78 of the valve stem is urged against the annular stem stop shoulder surface 82 of the tubular seal carrier 54 by pressure induced force and develops an essentially metal-to-metal seal of the valve stem to the seal carrier and prevents or minimizes any leakage from the valve chamber along the valve stem. The sealing capability of this metal-to-metal seal is directly responsive to the pressure within the valve chamber; thus an increase in valve chamber pressure will result in increased sealing capability of surfaces 82 and 83.

FIGS. 15 and 16 are representative of a condition wherein excessive heat has destroyed or degraded the elastomer or polymer seals of the line connection flanges 190 and 192 with the valve body 12 and where seals between the line connection flanges and the valve body are maintained by metal-to-metal seals. As shown in FIG. 15, the annular seal recess 199 normally contains an elastomer or polymer seal member 198 that is typically in the form of an O-ring seal. As explained above, the annular seal recess 199 is formed in an axially extending portion 182 of the valve body 12. The axially extending portion 182 of the valve body defines a substantially planar metal sealing surface that is positioned for metal-to-metal sealing engagement with the annular axially projecting portion 183 of the line connection flange member 190. The axially projecting portions 182 and 184 cause the outer peripheral portion of the line connection flange to be disposed in spaced relation with the outer peripheral portion of the valve body as is evident in FIGS. 6, 15 and 16. As the flange retainer bolts 194 are tightened the outer peripheral portion of the line connection flange 190 can be yielded to a limited extent. The force of the retainer bolts causes the axially projecting portion 183 of the line connection flange to be forced into tight metal-to-metal sealing engagement with axially projecting portion 182 of the valve body. The metal-to metal engagement of the axially projecting portions of the valve body and line connection flange causes the annular seal member 198 to be captured within its annular seal groove 199 so that it cannot be displaced or extruded from the seal groove by the highest pressure for which the valve is designed.

As shown in FIG. 16, the only difference in the relationship of the line connection flange 192 with the valve body 12 is that the seat retainer member 104 defines an axially extending portion 184 that extends beyond an axial end surface 179 of the valve body 12 and defines an annular inner peripheral sealing surface 181 of generally planar configuration. The axially projecting annular contact face portion 185 of the line connection flange 192 defines an inner peripheral annular sealing surface 187, shown in FIG. 16, which is also of generally planar configuration and is disposed for metal-to-metal sealing engagement with the annular inner peripheral sealing surface 181 of the seat retainer member 104. With the annular metal sealing surfaces 185 and 187 in sealing engagement the line connection flange 192 is spaced from the axial end surface 178 of the valve body 12. Thus, when the retainer bolts 196 are tightened, the line connection flange 192 is subject to being yielded to a limited extent. This arrangement also permits the annular metal sealing surfaces 185 and 187 to be drawn into tight metal-to-metal sealing engagement and entraps the annular sealing member 200 within its seal groove 201. If the seal member 200 is destroyed by excessive heat, as shown in FIG. 16 efficient sealing of the line connection flange to the valve body will be maintained by the tight metal-to-metal seal of surfaces 181 and 187.

The fragmentary sectional views of FIGS. 17 and 18 illustrate the lateral seat movement feature of the present invention and also illustrate the smooth flow feature of the valve that is controlled by the internal geometry of the annular laterally moveable and self-centering seat member and the annular seat support member. Though the embodiment shown in FIGS. 17 and 18 are also designed for fire-safe application, it should be borne in mind that the seat assembly functions in the same manner as discussed above in connection with the discussion of FIGS. 1-8. It should also be borne in mind that the seat recesses 100 may be defined directly in the valve body structure 12 as shown at the left side portion of FIG. 1 or may be defined within a seat retainer member 104 such as shown at the right side portion of FIG. 1. Like components are again referred to by like reference numerals as compared with other figures of the drawings.

FIG. 17 is representative of the valve mechanism with the annular seat member 140 centered with respect to the longitudinal axis of the flow passages 14 and 16. When the annular seat member is so positioned the cylindrical outer surface 150 of the annular seat member 140 will be disposed in spaced relation with the enlarged generally cylindrical surface 146 of seat recess 100 thereby establishing an annular clearance 148. Under certain conditions of valve operation, to establish proper sealing engagement of the annular seat member with respect to the spherical external sealing surface 158 of the valve ball member 20 the seat member is free to shift laterally within the enlarged portion of the seat recess. FIG. 18 illustrates the maximum laterally shifted position of the annular seat member and shows the outer annular peripheral surface 150 of the annular seat member in movement limiting contact with the enlarged cylindrical surface 146 of the seat recess. Obviously, at this maximum laterally shifted position the annular seat member is disposed in off-center relation with the longitudinal axis of the flow passages of the valve mechanism. At this maximum laterally shifted position the opposite side of the annular seat member will have increased clearance with respect to the enlarged cylindrical surface 146 of the seat recess. Typically, with the annular seat member shifted from its normal co-axial position with respect to the axes of the flow passages, there will be at least some clearance between the outer peripheral surface 148 of the annular seat member and the enlarged inner cylindrical surface 146 of the seat recess.

Even at the maximum laterally shifted position of the annular seat member as shown in FIG. 18, as indicated by the flow arrows, the flow of fluid medium through the open valve mechanism will be smooth and any internal condition for development of turbulence will be minimized. The tapered internal annular surfaces 161 and 164 of the annular seat member and the tapered internal annular surface 166 of the seat support member 120 will serve to deflect the flowing fluid so that it will maintain a condition of smooth flow. In the event any line cleaning devices such as scrapers, pigs, balls etc are passed through the valve mechanism the tapered surfaces will function as guide surfaces to guide the devices through the flow passages and port of the valve. The tapered surfaces will not permit the devices to become lodged or stuck within the flow passages. The tapered surfaces of the seat member and seat support member also minimize the potential for damage to any of the internal components of the valve mechanism, which might otherwise occur if abrupt shoulder surfaces were presented due to lateral seat shifting.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A ball valve having self-centering seats, comprising:
   a valve body defining a valve chamber and having flow ports in fluid communication with said valve chamber, said valve body further defining a seat recess having an annular seat recess surface;
   a valve ball member having a flow passage therethrough and defining an external generally spherical sealing surface and being rotatably moveable within said valve chamber between an open position with said flow passage in fluid communication with said flow ports and a closed position blocking fluid communication of said flow passage with said flow ports;
   an annular valve seat member being disposed for movement within said seat recess and having a sealing face in sealing engagement with said external generally spherical sealing surface, said annular valve seat member defining an annular outer peripheral surface of smaller dimension as compared with said annular seat recess surface and being normally disposed in annularly spaced relation with said annular seat recess surface, said annular valve seat member being moveable laterally within said seat recess for optimum sealing engagement with said external generally spherical sealing surface of said valve ball member;
   an annular seat support member being position for movement within said seat recess and having engagement with said valve seat member;

a spring member within said seat recess and having force transmitting engagement with said annular seat support member and urging said annular seat support member and said annular valve seat member toward said valve ball member;

an annular face seal member being carried by said annular valve seat member and establishing sealing of said annular valve seat member with said external generally spherical sealing surface of said valve ball member and defining a first pressure responsive area; and an annular seal member establishing sealing of said annular seat support member to said annular valve seat member and defining a second pressure responsive area being greater than said first pressure responsive area, fluid pressure within said valve acting on the area differential of said first and second pressure responsive areas and urging said annular valve seat member to forcible sealing engagement with said external generally spherical sealing surface of said valve ball member.

2. The ball valve of claim 1, comprising:

an internal annular tapered guide surface being defined by said annular valve seat member and directing smooth fluid flow through said valve at all positions of said annular valve seat member with respect to said valve body and said annular seat recess.

3. The ball valve of claim 2, comprising:

an annular seat support member being positioned for movement within said seat recess and having positioning engagement with said annular valve seat member and having sealed relation with said valve body within said seat recess; and an annular tapered internal guide surface being defined by said annular seat support member and further directing smooth flow of fluid through said valve mechanism at all positions of said annular valve seat member with respect to said valve body and said annular seat recess.

4. The ball valve of claim 1, comprising:

an annular seal member establishing sealing of said annular seat support member to said valve body within said seat recess and defining a third pressure responsive area being greater than said first and second pressure responsive areas and establishing an area differential, fluid pressure within said valve acting on said area differential and developing a resultant force acting in a direction urging said annular seat support member and said annular valve seat member toward said valve ball member and urging said annular valve seat member to forcible sealing engagement with said external generally spherical sealing surface of said valve ball member.

5. The ball valve of claim 4, comprising:

said annular seal member being a heat resistant seal member maintaining sealing integrity of said annular seat support member with respect to said valve body under conditions of elevated heat and establishing a fire-safe valve rating;

said annular face seal member being resilient and being carried by said annular valve seat member and normally establishing sealing engagement with said spherical sealing surface of said valve ball member; and said annular valve seat member having a metal sealing surface establishing metal-to-metal sealing with said spherical sealing surface of said valve ball member in the event of destruction of said resilient face seal member by excessive heat.

6. The ball valve of claim 1, comprising:

opposed axially aligned trunnion members being defined by said valve ball member;

annular trunnion support members being located within said valve body and being positioned about said trunnion members;

trunnion bearing members being interposed between said trunnion members and said annular trunnion support members; and a seat retainer member having threaded engagement within said valve body and defining a seat recess, said seat retainer member being sealed to said valve body and having retaining engagement with said annular trunnion support members.

7. The ball valve of claim 6, comprising:

said valve body defining an end surface;

an annular projection extending beyond said end surface and defining an annular flange sealing face;

said seat retainer member projecting beyond said end surface and defining a second annular flange sealing face; and pipe flange members being mounted to said valve body and being sealed to said annular flange sealing faces of said valve body and seat retainer member.

8. The ball valve of claim 6, comprising:

said valve body defining an annular internal tapered surface; and said seat retainer member defining an annular yieldable metal lip, upon threading of said seat retainer member into said valve body said annular yieldable metal lip contacting and becoming deformed by said annular internal tapered surface and establishing an annular metal to metal seal with said annular internal tapered surface.

9. The ball valve of claim 8, comprising:

said valve body defining internally threaded axial ends; and a seat retainer member being threaded into each of said internally threaded axial ends and each seat retainer member defining a seat recess.

10. The ball valve of claim 1, comprising:

a stem passage being defined by said valve body and being in communication with said valve chamber;

a valve stem being disposed for rotatable movement within said stem passage;

a packing gland being mounted in fixed relation with said valve body and having a stem packing assembly extending into said stem passage and establishing sealing with said valve body and with said valve stem;

an annular stem thrust bearing having bearing engagement with said stem packing assembly; and an annular flange being defined by said valve stem and having thrust force transmitting engagement with said annular stem thrust bearing, in the event of destruction of said annular stem thrust bearing by excessive heat said annular flange establishing metal-to-metal sealing with said stem packing assembly.

11. A ball valve having self-centering seats, comprising:

a valve body defining a valve chamber and having flow ports in fluid communication with said valve chamber, said valve body further defining a pair of seat recesses each having an annular seat recess surface;

a valve ball member within said valve chamber having a flow passage therethrough and defining an external generally spherical sealing surface and being rotatably moveable within said valve chamber between an open position with said flow passage in fluid communication with said flow ports and a closed position blocking fluid communication of said flow passage with said flow ports, said valve ball member having a pair of trunnion members;

trunnion support members being located within said valve chamber and supporting said trunnion members for rotational movement of said valve ball member to said open and closed positions;

an annular valve seat member being disposed for movement within each of said seat recess and having a face sealing member in sealing engagement with said external generally spherical sealing surface, said annular valve seat member defining an annular outer peripheral surface of smaller dimension as compared with said annular seat recess surface and being normally disposed in annularly spaced relation with said annular seat recess surface, said annular valve seat member being moveable laterally within said seat recess for optimum sealing engagement with said external generally spherical sealing surface of said valve ball member;

an annular seat support member being moveable within each of said seat recesses and having sealed relation with said annular valve seat member; and a spring member in each of said seat recesses and having spring force transmitting relation with said valve body and said annular seat support member and urging said annular seat support member and said annular valve seat member toward said valve ball member;

an annular face seal member being carried by said annular valve seat member and establishing sealing of said annular valve seat member with said external generally spherical sealing surface of said valve ball member and defining a first pressure responsive area; and an annular seal member establishing sealing of said annular seat support member to said annular valve seat member and defining a second pressure responsive area being greater than said first pressure responsive area, fluid pressure within said valve acting on the area differential of said first and second pressure responsive areas and urging said annular valve seat member to forcible sealing engagement with said external generally spherical sealing surface of said valve ball member.

12. The ball valve of claim 11, comprising:

an annular face seal groove being defined by said annular valve seat member;

said annular face seal member being located within said annular face seal groove and having sealing engagement with said valve ball member; and an annular inclined seal retainer lip being defined by said annular valve seat member and retaining said annular face seal member within said annular face seal groove.

13. The ball valve of claim 11, comprising:

said annular seat support member being positioned for movement within said seat recess and having positioning engagement with said annular valve seat member and having sealed relation with said valve body within said seat recess; and an annular tapered internal guide surface being defined by said annular seat support member and further directing smooth flow of fluid through said valve mechanism at all positions of said annular valve seat member with respect to said valve body and said annular seat recess.

14. The ball valve of claim 11, comprising:

said annular seal member being a heat resistant seal member maintaining sealing integrity of said annular seat support member with respect to said valve body under conditions of elevated heat and establishing a fire-safe valve rating;

a resilient face seal member being carried by said annular valve seat member and normally establishing sealing engagement with said spherical sealing surface of said valve ball member; and said annular valve seat member having a metal sealing surface establishing metal-to-metal sealing with said spherical sealing surface of said valve ball member in the event of destruction of said resilient face seal member by excessive heat.

15. The ball valve of claim 11, comprising:

a seat retainer member having threaded engagement within said valve body and defining a seat recess, said seat retainer member being sealed to said valve body and having retaining engagement with said annular trunnion support members;

said valve body defining an end surface;

an annular projection extending beyond said end surface and defining an annular flange sealing face;

said seat retainer member projecting beyond said end surface and defining a second annular flange sealing face;

flange members being mounted to said valve body and being sealed to said annular flange sealing faces of said valve body and seat retainer member;

said valve body defining an annular internal tapered surface; and said seat retainer member defining an annular yieldable metal lip, upon threading of said seat retainer member into said valve body said annular yieldable metal lip contacting and becoming deformed by said annular internal tapered surface and establishing an annular metal to metal seal with said annular internal tapered surface.

16. A ball valve having self-centering seats, comprising:

a valve body defining a valve chamber and having flow ports in fluid communication with said valve chamber, said valve body further defining a first seat recess having an annular seat recess surface, said valve body defining a seat retainer receptacle;

a valve ball member within said valve chamber having a flow passage therethrough and defining an external generally spherical sealing surface and being rotatably moveable within said valve chamber between an open position with said flow passage in fluid communication with said flow ports and a closed position blocking fluid communication of said flow passage with said flow ports, said valve ball member having a pair of trunnion members;

trunnion support members being located within said valve chamber and supporting said trunnion members for rotational movement of said valve ball member to said open and closed positions;

a seat retainer member being seated within said seat retainer receptacle and defining a second seat recess, said seat retainer member being sealed to said valve body and having retaining engagement with said trunnion support members;

annular valve seat members being disposed for movement within said first and second seat recesses and each having a face sealing member in sealing engagement with said external generally spherical sealing surface, said annular valve seat members defining an annular outer peripheral surface of smaller dimension as compared with said annular seat recess surface and being normally disposed in annularly spaced relation with said annular seat recess surface, said annular valve seat member being moveable laterally within said seat recess for optimum sealing engagement with said external generally spherical sealing surface of said valve ball member;

an annular seat support member being moveable within each of said seat recesses and having sealed relation with said annular valve seat member;

a spring member in each of said seat recesses and having spring force transmitting relation with said valve body and said annular seat support member;

said valve body defining an annular internal tapered surface; and said seat retainer member defining an annular yieldable metal lip, upon threading of said seat retainer member into said valve body said annular yieldable metal lip contacting and becoming deformed by said annular internal tapered surface and establishing an annular metal to metal seal with said annular internal tapered surface.

17. The ball valve of claim 16, comprising:

said seat retainer member having threaded engagement within said valve body and being sealed to said valve body and having retaining engagement with said annular trunnion support members;

said valve body defining an end surface;

an annular projection extending beyond said end surface and defining an annular flange sealing face;

said seat retainer member projecting beyond said end surface and defining a second annular flange sealing face; and flange members being mounted to said valve body and being sealed to said annular flange sealing faces of said valve body and seat retainer member.

\* \* \* \* \*